(12) United States Patent
Kidesaki

(10) Patent No.: US 12,280,617 B2
(45) Date of Patent: Apr. 22, 2025

(54) PNEUMATIC TIRE AND TIRE MOLDING MOLD

(71) Applicant: The Yokohama Rubber Co., LTD., Tokyo (JP)

(72) Inventor: Takashi Kidesaki, Kanagawa (JP)

(73) Assignee: The Yokohama Rubber Co., LTD., Tokyo (JP)

(*) Notice: Subject to any disclaimer, the term of this patent is extended or adjusted under 35 U.S.C. 154(b) by 349 days.

(21) Appl. No.: 17/753,289

(22) PCT Filed: Jul. 2, 2020

(86) PCT No.: PCT/JP2020/026104
§ 371 (c)(1),
(2) Date: Feb. 25, 2022

(87) PCT Pub. No.: WO2021/039117
PCT Pub. Date: Mar. 4, 2021

(65) Prior Publication Data
US 2022/0297480 A1  Sep. 22, 2022

(30) Foreign Application Priority Data
Aug. 30, 2019  (JP) .................................. 2019-159091

(51) Int. Cl.
*B60C 11/12* (2006.01)
*B29D 30/06* (2006.01)
*B60C 11/16* (2006.01)

(52) U.S. Cl.
CPC ...... *B60C 11/1236* (2013.01); *B29D 30/0606* (2013.01); *B60C 11/1204* (2013.01);
(Continued)

(58) Field of Classification Search
CPC ............ B60C 11/1204; B60C 11/1218; B60C 11/1236; B60C 11/1259; B60C 11/14;
(Continued)

(56) References Cited

U.S. PATENT DOCUMENTS

| 5,327,953 | A | 7/1994 | Ichiki |
| 2013/0328240 | A1 | 12/2013 | Takahashi |
| 2015/0107739 | A1* | 4/2015 | Joo ..................... B60C 11/1218 152/209.18 |

FOREIGN PATENT DOCUMENTS

| CN | 102950978 A | 3/2013 | |
| EP | 2202096 A2 * | 6/2010 | ......... B60C 11/1625 |

(Continued)

OTHER PUBLICATIONS

European Search Report for Serial No. EP 20856751 dated Sep. 4, 2023, 5 pages.

*Primary Examiner* — Justin R Fischer
*Assistant Examiner* — Wendy L Boss
(74) *Attorney, Agent, or Firm* — Thorpe North & Western

(57) ABSTRACT

A pneumatic tire includes sipes disposed in a land portion formed in a tread portion, and pin holes for stud pins disposed in the land portion. The sipes are disposed at positions where a distance Ds from the pin hole and a diameter Dp of the pin hole satisfy (Ds/Dp)≥4.0. A sipe in which the distance Ds from the pin hole and the diameter Dp of the pin hole satisfy (Ds/Dp)≤5.0 is defined as a pin hole neighboring sipe. A sipe of which the distance Ds from the pin hole is the smallest, among the sipes in which the distance Ds from the pin hole and the diameter Dp of the pin hole satisfy (Ds/Dp)>5.0, is defined as a normal sipe. The pin hole neighboring sipe is formed in a high rigidity shape having higher rigidity than the normal sipe.

13 Claims, 17 Drawing Sheets

(52) U.S. Cl.
CPC ...... *B60C 11/16* (2013.01); *B29D 2030/0612* (2013.01); *B29D 2030/0613* (2013.01); *B60C 2011/1213* (2013.01); *B60C 2011/1268* (2013.01)

(58) Field of Classification Search
CPC ............. B60C 11/16; B60C 2011/1213; B60C 2011/1286; B60C 2011/1268; B29D 2030/662; B29D 30/0606; B29D 30/66; B29D 2030/0612; B29D 2030/0613
See application file for complete search history.

(56) References Cited

FOREIGN PATENT DOCUMENTS

| | | |
|---|---|---|
| EP | 2 955 037 A1 | 12/2015 |
| EP | 2641754 B1 | 4/2017 |
| EP | 3 202 593 A1 | 8/2017 |
| JP | 2000-272309 A | 10/2000 |
| JP | 2008-24213 A | 2/2008 |
| JP | 2008-230259 A | 10/2008 |
| JP | 2008-265346 A | 11/2008 |
| JP | 2010-070052 A | 4/2010 |
| JP | 2012-011690 A | 1/2012 |
| JP | 5098383 B2 | 12/2012 |
| JP | 2013-224134 A | 10/2013 |
| JP | 2013-252690 A | 12/2013 |
| JP | 2014-128886 A | 7/2014 |
| JP | 2016-068721 A | 5/2016 |
| WO | 2014/123181 A1 | 8/2014 |

\* cited by examiner

| | Conventional Example | Example 1 | Example 2 | Example 3 | Example 4 | Example 5 | Example 6 | Example 7 | Example 8 |
|---|---|---|---|---|---|---|---|---|---|
| Shape of pin neighboring sipe relative to normal sipe | Identical reference shape | High rigidity shape | High rigidity shape | High rigidity shape | High rigidity shape | High rigidity shape | High rigidity shape | High rigidity shape | High rigidity shape |
| Maximum depth H1 of pin neighboring sipe | 8 mm | 7 mm | 4 mm | 2 mm | 4 mm | 4 mm | 4 mm | 4 mm | 4 mm |
| Maximum depth H2 of normal sipe | 8 mm | 8 mm | 8 mm | 8 mm | 8 mm | 8 mm | 8 mm | 8 mm | 8 mm |
| H1/H2 | 1.00 | 0.88 | 0.50 | 0.25 | 0.50 | 0.50 | 0.50 | 0.50 | 0.50 |
| Maximum width W1 of pin neighboring sipe | 0.5 mm | 0.5 mm | 0.5 mm | 0.7 mm | 0.7 mm | 0.8 mm | 0.7 mm | 0.7 mm | 0.7 mm |
| Maximum width W2 of normal sipe | 0.5 mm | 0.5 mm | 0.5 mm | 0.5 mm | 0.5 mm | 0.5 mm | 0.5 mm | 0.5 mm | 0.5 mm |
| W1/W2 | 1.00 | 1.00 | 1.00 | 1.40 | 1.40 | 1.60 | 1.40 | 1.40 | 1.40 |
| Shape of pin neighboring sipe | Two-dimensional sipe | Two-dimensional sipe | Two-dimensional sipe | Two-dimensional sipe | Two-dimensional sipe | Two-dimensional sipe | Three-dimensional sipe | Three-dimensional sipe | Three-dimensional sipe |
| Only pin neighboring sipe including less than three bend points has high rigidity shape | Bad | Bad | Bad | Bad | Bad | Bad | Bad | Good | Good |
| Only pin hole neighboring sipe located at or near division corresponding position has high rigidity shape | Bad | Bad | Bad | Bad | Bad | Bad | Bad | Bad | Good |
| Durability of mold | 100 | 120 | 150 | 200 | 200 | 220 | 300 | No bending | No bending |
| Performance on ice and snow | 100 | 97 | 97 | 95 | 97 | 95 | 98 | 98 | 100 |

FIG. 17

PNEUMATIC TIRE AND TIRE MOLDING MOLD

TECHNICAL FIELD

The present technology relates to a pneumatic tire and a tire molding mold.

BACKGROUND ART

Some known pneumatic tires are provided with so-called sipes, which are cuts formed in a tread portion, in order to improve performance on ice and snow, which is running performance on snowy roads and frozen road surfaces, and wet performance, which is running performance on wet road surfaces, and the like. The pneumatic tires used on icy and snowy road surfaces include so-called pneumatic studded tires in which stud pins are disposed in a tread portion in order to further improve the performance on ice and snow. In a pneumatic studded tire, the stud pin is disposed by inserting the stud pin into a pin hole formed in the tread portion. In this way, in a pneumatic tire in which stud pins are disposed in the tread portion, a variety of ideas have been applied to ensure the performance on ice and snow. For example, the pneumatic tires described in Japan Patent No. 5098383 and Japan Unexamined Patent Publication Nos. 2008-024213 and 2016-068721 try to maintain the performance on ice and snow by suppressing the stud pins from coming off.

Here, the pin hole formed in the tread portion is formed by a mold pin included in a tire molding mold used for vulcanization molding of a pneumatic tire, and the sipe is formed by a sipe blade. In this way, when vulcanization molding of a pneumatic tire is performed using a tire molding mold including a mold pin and a sipe blade, twisting is likely to occur in a blade disposed at or near the mold pin when the tire is detached from the mold after the vulcanization molding is performed, and failures may easily occur in the blade due to twisting.

In other words, the tire molding mold is often divided into a predetermined number of sectors in the tire circumferential direction, and when the tire is detached from the mold after the vulcanization molding, the divided sectors are detached from the tire in different directions for respective sectors. On the other hand, the sipe blade is disposed in a direction in which the height direction is substantially parallel to the tire radial direction, and thus the direction in which the sectors are detached from the tire is often in a direction different from the height direction of the blade. In this case, the blade is pulled out in a direction different from the depth direction rather than the direction along the depth direction of the sipe formed by the blade, but the sipe is formed of a rubber member. And thus, due to the elastic deformation of the rubber, it is possible to pull out the blade from the sipe while suppressing the occurrence of a failure such as bending or folding in the blade pulled out in a direction different from the depth direction of the sipe.

However, in the blade disposed at or near the mold pin, the amount of rubber located between the blade and the mold pin during vulcanization molding is small, and there is a small number of members that elastically deform when the sector is detached from the tire. Thus, when the depth direction of the sipe formed by the blade differs from the direction in which the sector is detached from the tire, that is, the direction in which the blade is pulled out from the sipe, a large force acts on the blade from a sipe having a small amount of deformation due to elastic deformation. In this way, a force acts the blade in the direction of twisting the blade, and the blade is prone to failure such as bending or folding by this force.

Occurrence of such a blade failure can be suppressed by reducing the number of the pin holes, but in a case where the number of stud pins inserted into the pin holes is reduced, the performance on ice and snow may deteriorate as compared to a case where a large number of stud pins are inserted. And thus, it is very difficult to provide the durability of the sipe blade during manufacturing of pneumatic tires and the performance on ice and snow of pneumatic tires in a compatible manner.

SUMMARY

The present technology provides a pneumatic tire and a tire molding mold that can provide the durability of sipe blades and the performance on ice and snow in a compatible manner.

A pneumatic tire according to the present technology includes, a plurality of sipes disposed in a land portion formed in a tread portion, and a plurality of pin holes for stud pins disposed in the land portion, the sipes being disposed at positions where a distance Ds from the pin hole and a diameter Dp of the pin hole satisfy a relationship of (Ds/Dp)≥4.0, the sipe, among the plurality of sipes, in which the distance Ds from the pin hole and the diameter Dp of the pin hole satisfy a relationship of (Ds/Dp)≤5.0 being defined as a pin hole neighboring sipe, the sipe of which the distance Ds from the pin hole is the smallest, among the sipes in which the distance Ds from the pin hole and the diameter Dp of the pin hole satisfy a relationship of (Ds/Dp)>5.0, being defined as a normal sipe, and the pin hole neighboring sipe being formed in a high rigidity shape having higher rigidity than the normal sipe.

In the pneumatic tire described above, preferably a maximum depth of the pin hole neighboring sipe is shallower than a maximum depth of the normal sipe.

In the pneumatic tire described above, preferably, a ratio of a maximum depth H1 of the pin hole neighboring sipe to a maximum depth H2 of the normal sipe is in a range of 0.3≤(H1/H2)≤0.8.

In the pneumatic tire described above, preferably, a ratio of a maximum width W1 of the pin hole neighboring sipe to a maximum width W2 of the normal sipe is in a range of 1.1≤(W1/W2)≤1.5.

In the pneumatic tire described above, preferably, the pin hole neighboring sipe is formed oscillating in a width direction in a depth direction.

In the pneumatic tire described above, preferably, only the pin hole neighboring sipe, in which the number of bend points is less than three in a length direction of the pin hole neighboring sipe among the plurality of pin hole neighboring sipes, is formed in the high rigidity shape.

In the pneumatic tire described above, preferably, the pneumatic tire being molded by a tire molding mold including a plurality of sectors divided in a tire circumferential direction, and only the pin hole neighboring sipe, among the plurality of pin hole neighboring sipes, located at or near a position corresponding to a division position between the sectors of the tire molding mold in the land portion, being formed in the high rigidity shape.

In order to solve the problems described above and achieve the object, a tire molding mold according to the present technology includes, a plurality of sectors divided in a tire circumferential direction, a plurality of sipe blades disposed on a tread molding surface of the sectors, and a plurality of mold pins disposed on the tread molding surface, the sipe blades being disposed at positions where a distance Dsm from the mold pin and a diameter Dpm of the mold pin satisfy a relationship of (Dsm/Dpm)≥4.0, the sipe blade, among the plurality of sipe blades, in which the distance Dsm from the mold pin and the diameter Dpm of the mold pin satisfy a relationship of (Dsm/Dpm)≤5.0, being defined as a pin neighboring blade, the sipe blade of which the distance Dsm from the mold pin is the smallest, among the sipe blades in which the distance Dsm of the mold pin and the diameter Dpm of the mold pin satisfy a relationship of (Dsm/Dpm)>5.0, being defined as a normal blade, and the pin neighboring blade being formed in a high rigidity shape having higher rigidity than the normal blade.

The pneumatic tire and the tire molding mold according the present technology can provide the durability of sipe blades and the performance on ice and snow in a compatible manner.

BRIEF DESCRIPTION OF DRAWINGS

FIG. 17 is a table showing results of performance evaluation tests of pneumatic tires.

DETAILED DESCRIPTION

Pneumatic tires and tire molding molds according to embodiments of the present technology will be described in detail below with reference to the drawings. However, the present technology is not limited by the embodiment. Constituents of the following embodiments include elements that are essentially identical or that can be substituted or easily conceived of by a person skilled in the art.

Embodiments

In the following description, the tire radial direction refers to a direction orthogonal to the rotation axis (not illustrated) of a pneumatic tire 1, the inner side in the tire radial direction refers to the side facing the rotation axis in the tire radial direction, and the outer side in the tire radial direction refers to the side away from the rotation axis in the tire radial direction. Moreover, the tire circumferential direction refers to the circumferential direction with the rotation axis as the center axis. Additionally, the tire width direction refers to a direction parallel with the rotation axis, the inner side in the tire width direction refers to a side toward the tire equatorial plane (tire equator line) CL in the tire width direction, and the outer side in the tire width direction refers to a side away from the tire equatorial plane CL in the tire width direction. The tire equatorial plane CL is a plane that is orthogonal to the rotation axis of the pneumatic tire 1 and passes through the center of the tire width of the pneumatic tire 1, and in the tire equatorial plane CL, the center line in the tire width direction, which is the center position of the pneumatic tire 1 in the tire width direction, coincides with the position in the tire width direction. The tire width is the width in the tire width direction between portions located on the outermost sides in the tire width direction, or in other words, the distance between the portions that are the most distant from the tire equatorial plane CL in the tire width direction. "Tire equator line" refers to a line along the tire circumferential direction of the pneumatic tire 1 that lies on the tire equatorial plane CL.

Pneumatic Tire

Figure 1:
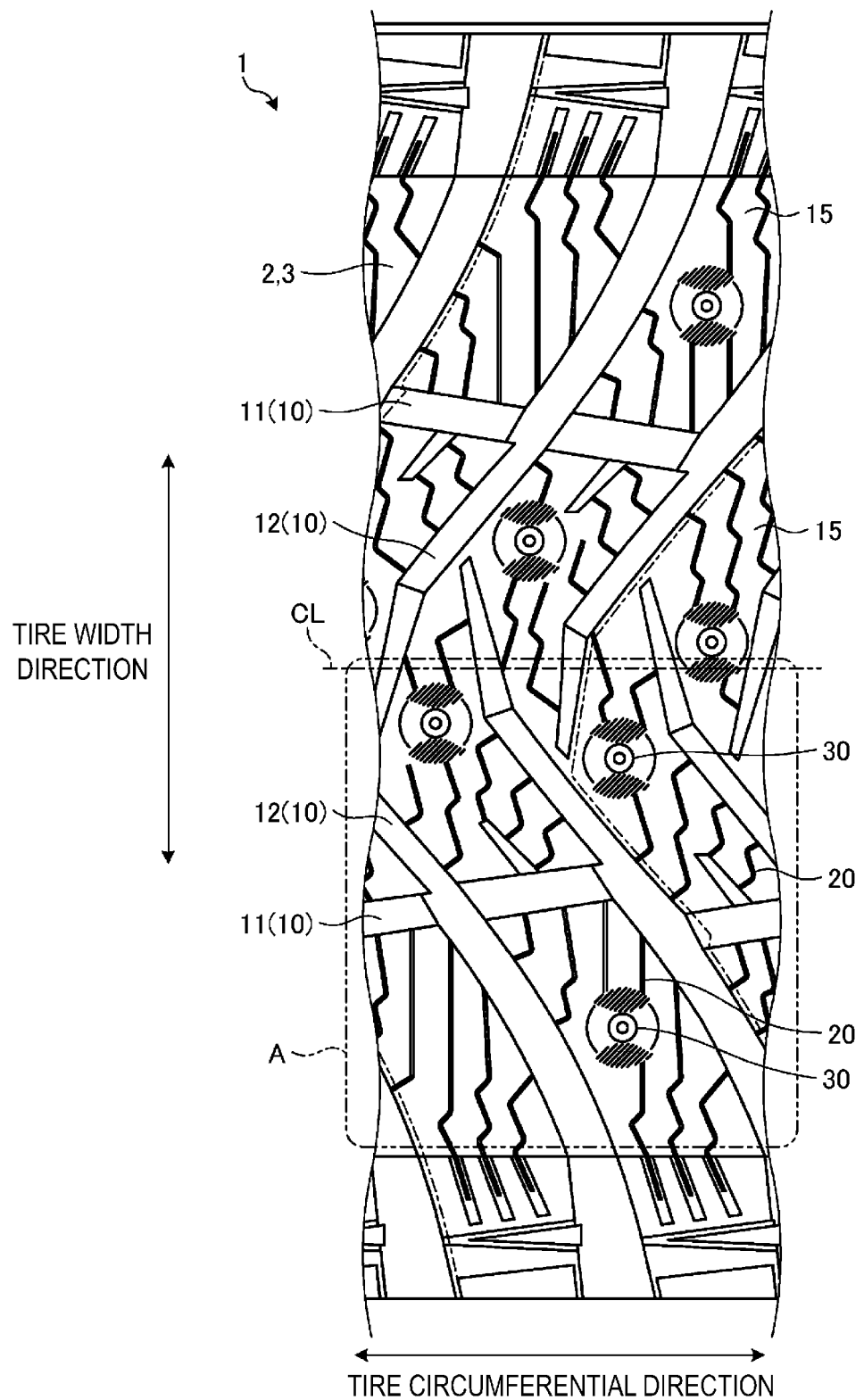
FIG. 1 is a plan view illustrating a road contact surface of a tread portion of a pneumatic tire according to an embodiment.

FIG. 1 is a plan view of a road contact surface 3 of a tread portion 2 of the pneumatic tire 1 according to an embodiment. The pneumatic tire 1 illustrated in FIG. 1 includes the tread portion 2 disposed at the outermost portion of the pneumatic tire 1 in the tire radial direction. The surface of the tread portion 2, in other words, a portion that comes into contact with a road surface when a vehicle (not illustrated) equipped with the pneumatic tire 1 travels is formed as the road contact surface 3. A plurality of grooves 10 are formed in the road contact surface 3, and a plurality of land portions 15 are defined by the plurality of grooves 10. As the grooves 10, for example, a plurality of circumferential grooves 11 extending in the tire circumferential direction and a plurality of lug grooves 12 extending in the tire width direction are formed. A tread pattern is formed by these grooves 10 and land portions 15 in the road contact surface 3. In the present embodiment, the lug grooves 12 are inclined in the tire circumferential direction while extending in the tire width direction, and the circumferential grooves 11 are formed between adjacent lug grooves 12 in the tire circumferential direction. The land portions 15 are formed in block shape by the circumferential grooves 11 and the lug grooves 12.

Additionally, a plurality of sipes 20 are formed in the road contact surface 3. The sipes 20 described herein are formed in a narrow groove shape in the road contact surface 3. In the sipes 20, when the pneumatic tire 1 is mounted on a regular rim, inflated to a regular internal pressure, and in an unloaded state, wall surfaces constituting the narrow groove do not contact one another, whereas in a case where the narrow groove is located in a portion of the ground contact surface formed on a flat plate in response to application of a load on the flat plate in the vertical direction or in a case where the land portion 15 provided with the narrow groove flexes, the wall surfaces constituting the narrow groove or at least parts of portions provided on the wall surface contact one another due to deformation of the land portion 15. Here, "regular rim" refers to a "standard rim" defined by JATMA (The Japan Automobile Tyre Manufacturers Association, Inc.), a "Design Rim" defined by TRA (The Tire and Rim Association, Inc.), or a "Measuring Rim" defined by ETRTO (The European Tyre and Rim Technical Organisation). Moreover, a regular internal pressure refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO. In the present embodiment, the width of the sipe 20 is within a range of 0.2 mm or more and 1.0 mm or less, and a depth thereof is within a range of 1 mm or more and 15 mm or less.

The sipes 20 are formed extending in the tire width direction at a predetermined depth, and are disposed in each of the land portions 15 defined by the grooves 10. Some of the sipes 20 bend in the tire circumferential direction while extending in the tire width direction and the sipes 20 vary in form.

Additionally, a plurality of pin holes 30 which are holes for stud pins (not illustrated) are disposed in the road contact surface 3 of the tread portion 2. The pin hole 30 is formed as a hole that opens to the road contact surface 3 in a substantially circular shape and extends in the tire radial direction. A metallic stud pin is inserted into the pin hole 30 and thus the stud pin can be disposed in the road contact surface 3. Note that, the portion of the stud pin inserted into the pin hole 30 has a different diameter depending on the position of the stud pin in the axial direction and thus the stud pin does not easily come out of the pin hole 30 after it is inserted into the pin hole 30. In line with this, the pin hole 30 has a different diameter depending on the depth direction of the pin hole 30.

Figure 2:
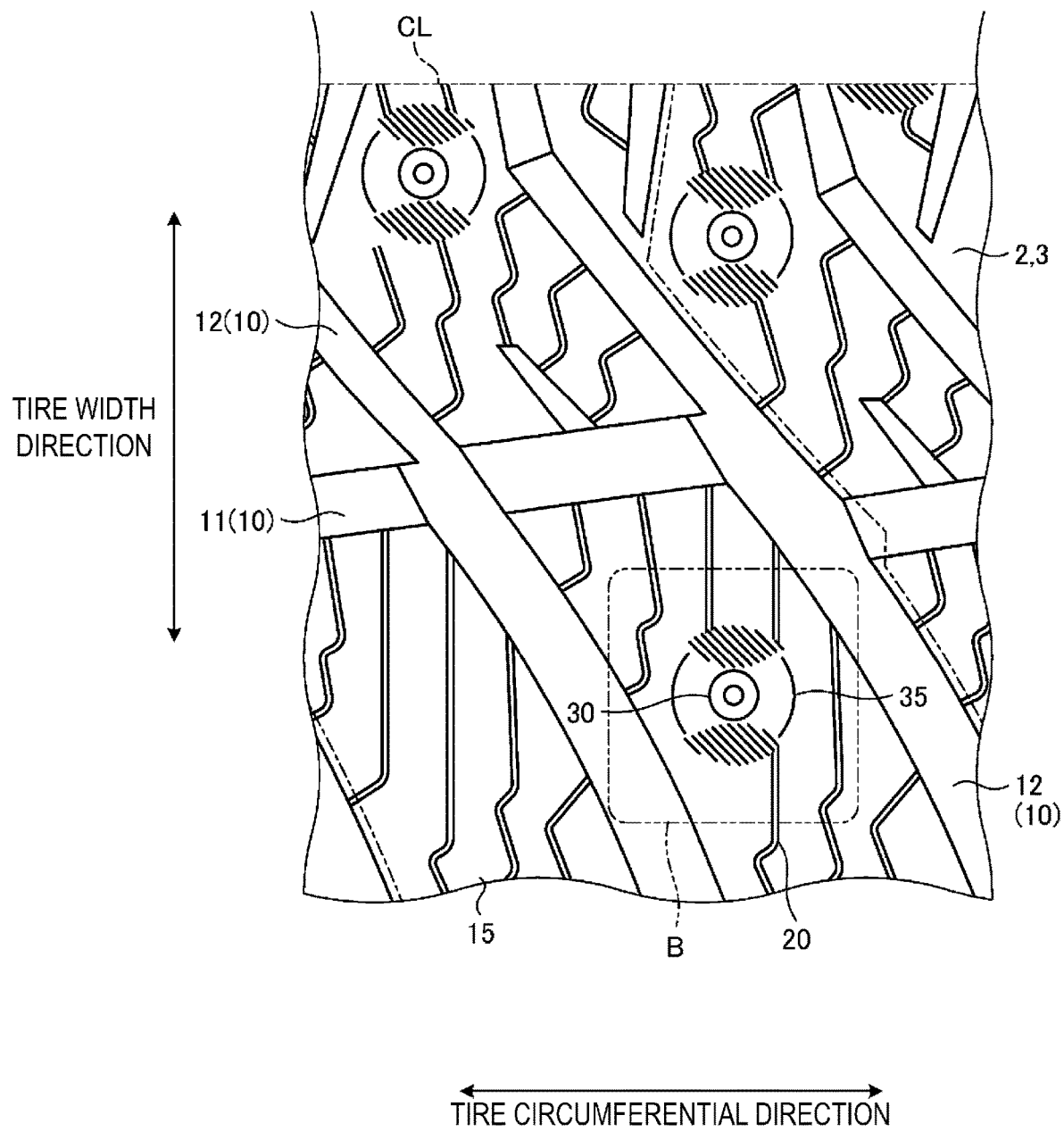
FIG. 2 is a detailed view of a portion A of FIG. 1.

FIG. 2 is a detailed view of the portion A of FIG. 1. A mark portion 35 is formed around the pin hole 30 such that the position of the pin hole 30 is easily identified. The mark portion 35 is formed around the pin hole 30 in the road contact surface 3 as an unevenness pattern. The mark portion 35 is formed in a substantially circular shape concentric with the pin hole 30, whose diameter is larger than the diameter of the pin hole 30. In addition, the mark portion 35 has a pattern that makes the pin hole 30 more noticeable. In the present embodiment, the pattern is formed in a substantially fan-shaped shape in the inner side of the circle of the mark portion 35, and is provided at two locations that are point-symmetrical about the center of the pin hole 30.

The mark portion 35 formed as the unevenness pattern has an unevenness amount within a range of 0.5 mm or less with respect to the surface of the road contact surface 3 where the unevenness pattern is not formed. In this case, the unevenness may be formed as protrusions from the road contact surface 3, or may be formed as recesses.

Some of the plurality of sipes 20 formed in the road contact surface 3 are also disposed near the pin hole 30. The sipe 20 disposed near the pin hole 30 is disposed on the outer side of the mark portion 35 without entering the inner side of the mark portion 35 formed in a substantially circular shape.

Figure 3:
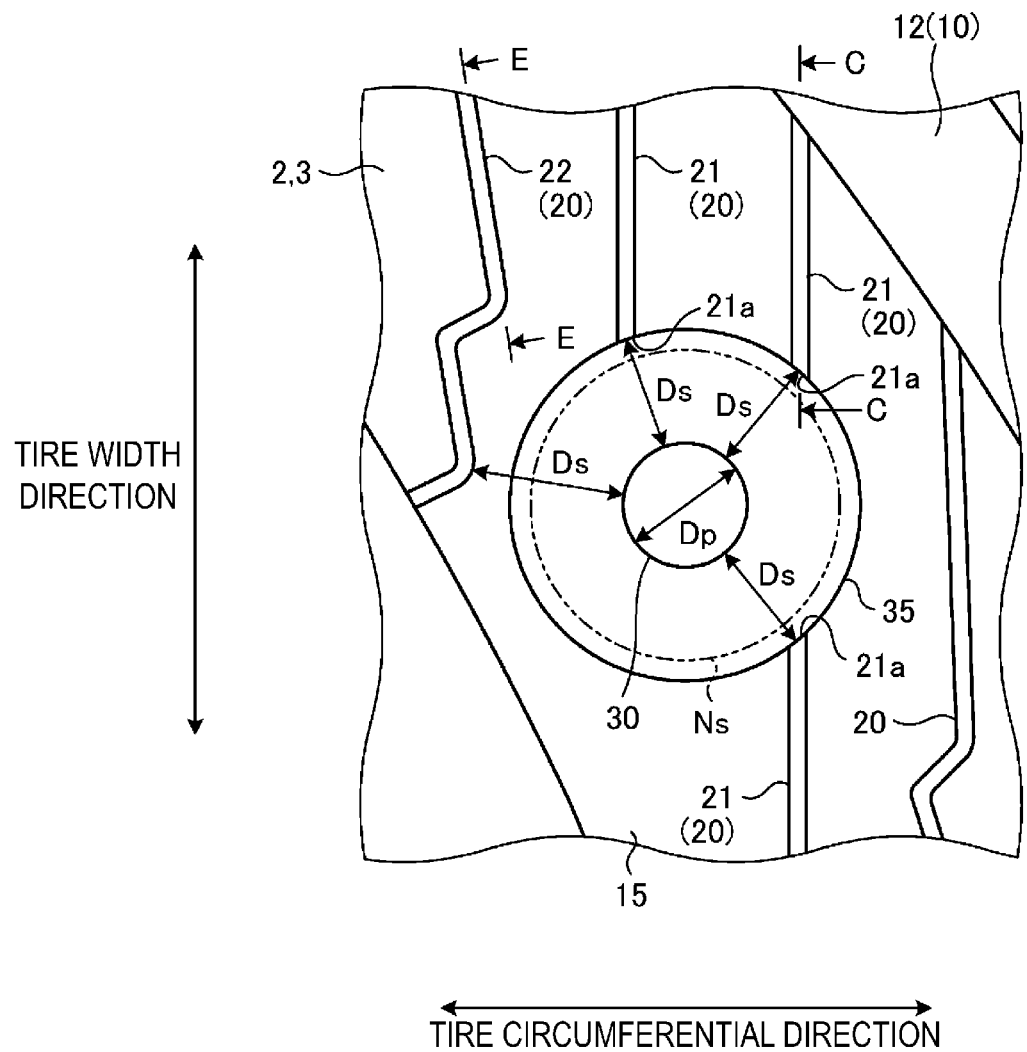
FIG. 3 is a detailed view of portion B of FIG. 2.

FIG. 3 is a detailed view of the portion B of FIG. 2. FIG. 3 shows the pin hole 30 and the mark portion 35 in a simplified manner so that the positional relationship between the sipe 20 and the pin hole 30 can be easily understood. The plurality of sipes 20 disposed in the road contact surface 3 are disposed at positions where the distance Ds from the pin hole 30 and the diameter Dp of the pin hole 30 satisfy a relationship of $(Ds/Dp) \geq 4.0$. That is, the sipe 20 is not disposed within a range from the pin hole 30 that is 4.0 times the diameter Dp of the pin hole 30, and the region within this range is a region Ns where the sipe 20 is not present. Specifically, the region Ns where the sipe 20 is not present is a region in which a groove or an unevenness having a depth of 1.0 mm or more including the sipe 20 is not present.

Note that in this case, the diameter Dp of the pin hole 30 is the diameter of the opening of the pin hole 30 that opens in a substantially circular shape with respect to the road contact surface 3. Additionally, the region Ns where the sipe 20 is not present is preferably within a range of 5.0 mm or more and 10.0 mm or less from the center of the pin hole 30. In the present embodiment, the radius of the mark portion 35 is larger than the radius of the region Ns where the sipe 20 is not present.

In addition, a pin hole neighboring sipe 21 which is the sipe 20 disposed near the pin hole 30 among the plurality of sipes 20 is formed in a high rigidity shape having higher rigidity than a normal sipe 22 which is the sipe 20 other than the pin hole neighboring sipe 21 disposed near the pin hole neighboring sipe 21.

The pin hole neighboring sipe 21 here is the sipe 20 in which the distance Ds from the pin hole 30 and the diameter Dp of the pin hole 30 satisfy a relationship of $(Ds/Dp) \leq 5.0$ among the plurality of sipes 20. That is, the pin hole neighboring sipe 21 is the sipe 20 in which the distance Ds from the pin hole 30, that is, the distance Ds of the portion closest to the pin hole 30, and the diameter Dp of the pin hole 30 satisfy a relationship of $4.0 \leq (Ds/Dp) \leq 5.0$. Specifically, in the pin hole neighboring sipe 21, the distance Ds from the pin hole 30 of the end portion 21a in the length direction and the diameter Dp of the pin hole 30 satisfy a relationship of $4.0 \leq (Ds/Dp) \leq 5.0$. Note that the number of pin hole neighboring sipes 21 corresponding to one pin hole 30 may be 0, or may be one or plural.

In addition, the normal sipe 22 is the sipe 20 of which the distance Ds from the pin hole 30 is the smallest among the sipes 20 in which the distance Ds from the pin hole 30 and the diameter Dp of the pin hole 30 satisfy a relationship of $(Ds/Dp) > 5.0$. That is, the normal sipe 22 is the sipe 20 of which the distance Ds from the pin hole 30 is the smallest among the sipes 20 other than the sipes 20 satisfying the definitions of the pin hole neighboring sipe 21. The pin hole neighboring sipe 21 is formed in a high rigidity shape having higher rigidity than the normal sipe 22 defined in this way.

Figure 4:
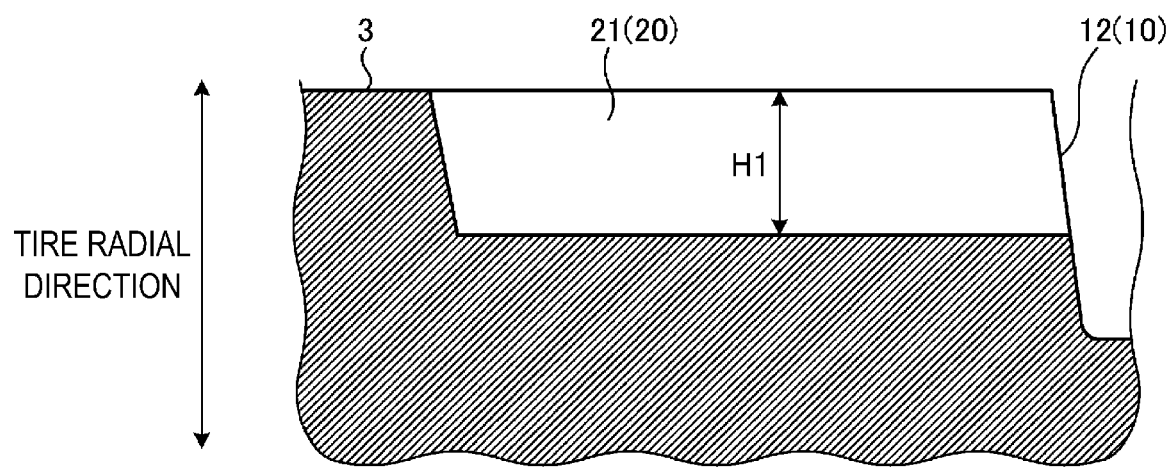
FIG. 4 is a cross-sectional view taken along the line C-C in FIG. 3.
Figure 5:
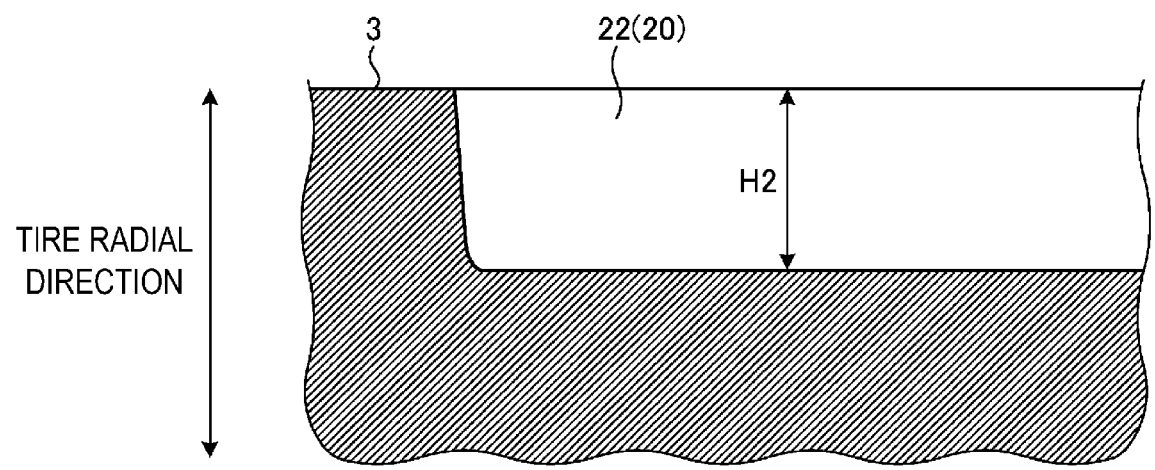
FIG. 5 is a cross-sectional view taken along the line E-E in FIG. 3.

FIG. 4 is a cross-sectional view taken along the line C-C in FIG. 3. FIG. 5 is a cross-sectional view taken along the line E-E in FIG. 3. The pin hole neighboring sipe 21 has a maximum depth H1 that is shallower than the maximum depth H2 of the normal sipe 22. As a result, the pin hole neighboring sipe 21 has rigidity higher than that of the normal sipe 22. That is, the pin hole neighboring sipe 21 has the maximum depth H1 shallower than the maximum depth H2 of the normal sipe 22. And thus, the volume of the space where the sipe 20 is formed, that is, the volume of the portion where the rubber constituting the land portion 15 is not disposed, is small, and the proportion of the disposed rubber is large, and thus, the rigidity is high. Specifically, the ratio of the maximum depth H1 of the pin hole neighboring sipe 21 to the maximum depth H2 of the normal sipe 22 is in the range of $0.3 \leq (H1/H2) \leq 0.8$.

Tire Molding Mold

Now, a tire molding mold 100 according to the embodiment will be described. Note that in the following description, the tire radial direction of the pneumatic tire 1 will be described as the tire radial direction in the tire molding mold 100 and that the tire width direction of the pneumatic tire 1 will be described as the tire width direction of the tire molding mold 100 and that the tire circumferential direction of the pneumatic tire 1 will be described as the tire circumferential direction in the tire molding mold 100.

Figure 6:
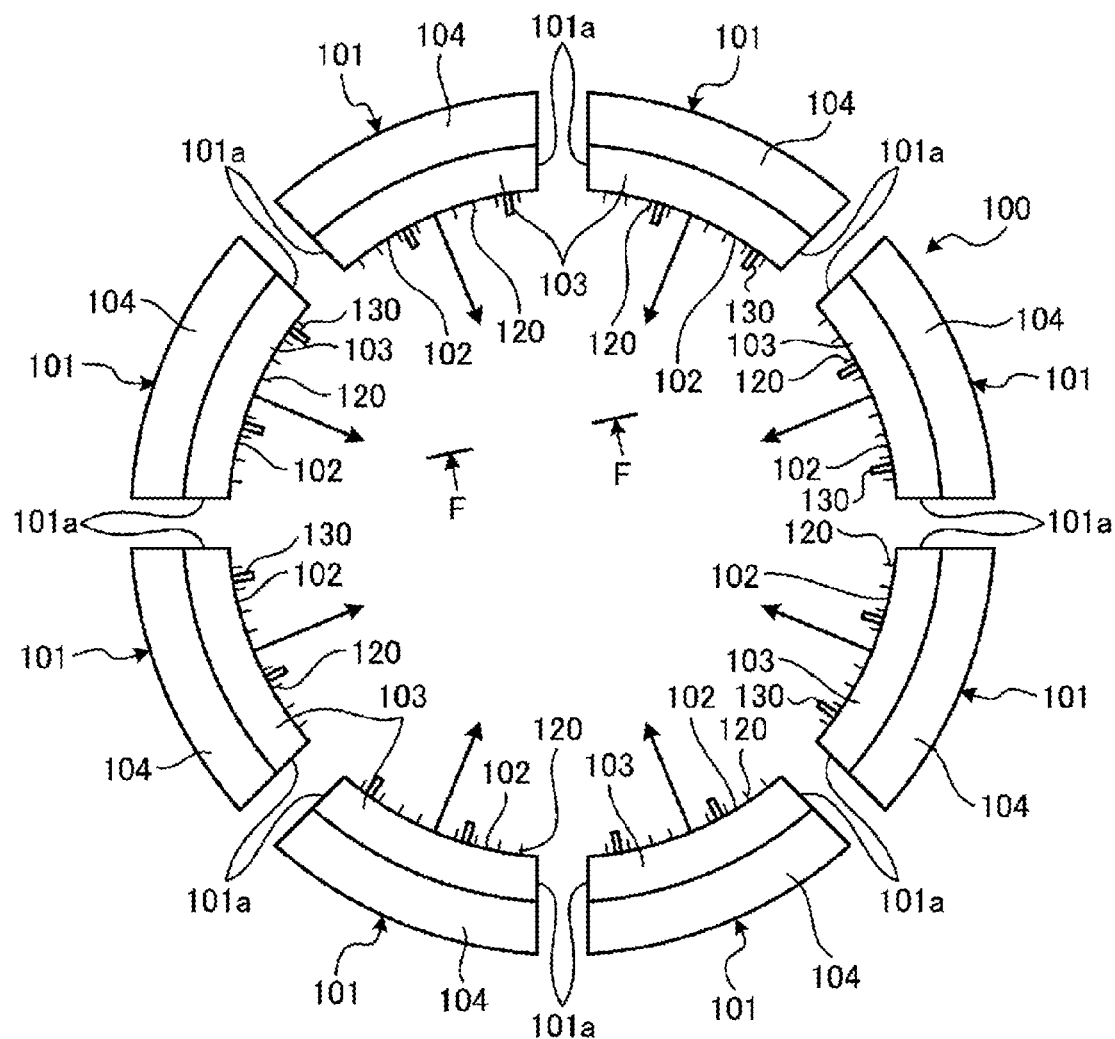
FIG. 6 is an explanatory diagram of a tire molding mold for manufacturing a pneumatic tire according to an embodiment.

FIG. 6 is an explanatory diagram of the tire molding mold 100 for manufacturing the pneumatic tire 1 according to an embodiment. As illustrated in FIG. 6, the tire molding mold 100 is configured as a so-called sector mold corresponding to a divided tire molding mold 100, and has an annular structure in which a plurality of sectors 101 separated from one another in the tire circumferential direction are connected to one another. Note that in FIG. 6, the tire molding mold 100 is illustrated in the form of an eight-division structure including eight sectors 101, but the number of divisions of the tire molding mold 100 is not limited to eight.

One sector 101 includes a plurality of pieces 103 for forming the tread portion 2 of the pneumatic tire 1 corresponding to a product, and a back block 104 in which the pieces 103 are mounted adjacent to one another. One piece 103 corresponds to a portion of the tread pattern formed in the tread portion 2 of the pneumatic tire 1, and includes a tread molding surface 102 for forming a part of the tread pattern. One sector 101 includes a plurality of pieces 103 in the tire circumferential direction and the tire width direction, respectively (not illustrated), and the plurality of pieces 103 are assembled to constitute the tread molding surface 102 of one sector 101. In other words, the piece 103 of one sector 101 is divided into a plurality of pieces 103.

In the back block 104, a plurality of pieces 103 are mounted and held in a predetermined arrangement. One sector 101 is thus configured.

The tire molding mold 100 is configured by using a plurality of the sectors 101 configured as described above and connecting the plurality of sectors 101 in an annular shape. In the tire molding mold 100, the plurality of sectors 101 are connected together in an annular shape to assemble the tread molding surfaces 102 of the sectors 101, forming the tread molding surface 102 of the entire tread pattern.

Figure 7:
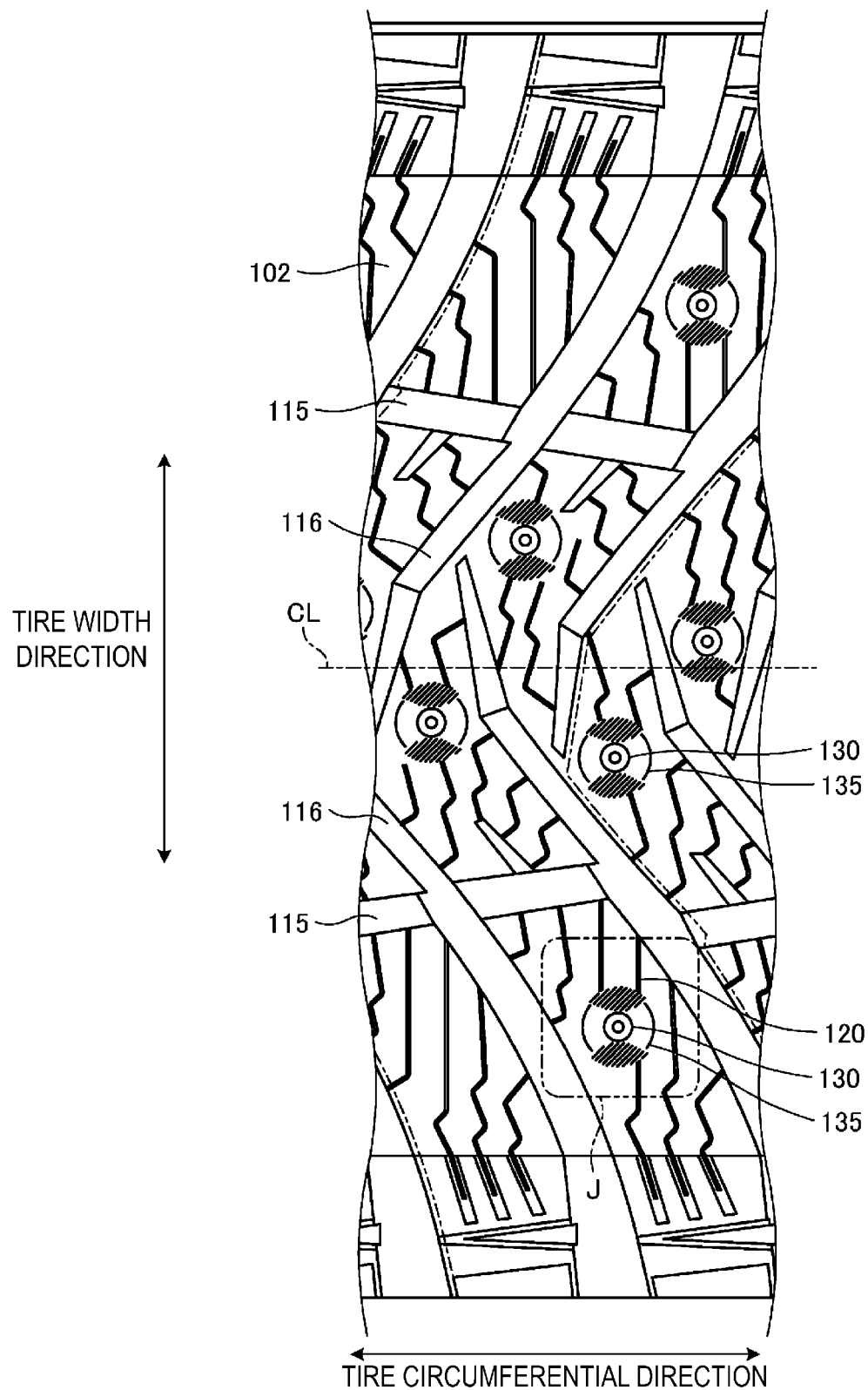
FIG. 7 is a view in the direction of arrow F-F in FIG. 6 and is an explanatory diagram of a state in which sectors are connected together.

FIG. 7 is a view in the direction of arrow F-F in FIG. 6, and is an explanatory diagram of a state in which the sectors 101 are connected together. In the tread molding surface 102 in each sector 101, a plurality of circumferential groove forming bones 115 are disposed that form the circumferential grooves 11 in the tread portion 2 of the pneumatic tire 1, a plurality of lug groove forming bones 116 are disposed that form the lug grooves 12, a plurality of sipe blades 120 that form the sipes 20, and a plurality of mold pins 130 that form the pin holes 30 are disposed. In this regard, the circumferential groove forming bones 115 and the lug groove forming bones 116 are formed in a rib-like shape protruding from the tread molding surface 102, and the sipe blades 120 are formed as plate-like members formed from a metal material. For example, stainless steel is used as the metal material that forms the sipe blade 120. Additionally, the sipe blades 120 are disposed on the tread molding surface 102 such that the sipe blades 120 are identical in number to the sipes 20 formed in the tread portion 2. The sipe blades 120 are respectively disposed at positions in the tread molding surface 102 corresponding to positions in the tread portion 2 where the sipes 20 are disposed.

Additionally, the mold pin 130 is formed in a substantially cylindrical shape protruding from the tread molding surface 102 such that the mold pin 130 is formed in a substantially cylindrical shape with the diameter being different depending on the position in the axial direction of the cylinder. Additionally, the mold pins 130 are disposed on the tread molding surface 102 such that the sipe blades 120 are identical in number to the pin holes 30 formed in the tread portion 2. The mold pins 130 are respectively disposed at positions in the tread molding surface 102 corresponding to positions in the tread portion 2 where the pin holes 30 are disposed.

A mark forming portion 135 that forms the mark portion 35 in the road contact surface 3 is formed on the base of the mold pin 130 in the tread molding surface 102. The mark forming portion 135 is formed as an unevenness pattern around the mold pin 130 in the tread molding surface 102. Some of the plurality of sipe blades 120 disposed in the tread molding surface 102 are also disposed near the mold pin 130. The sipe blade 120 disposed near the mold pin 130 is disposed on the outer side of the mark forming portion 135 without entering the inner side of the mark forming portion 135 formed in a substantially circular shape.

Figure 8:
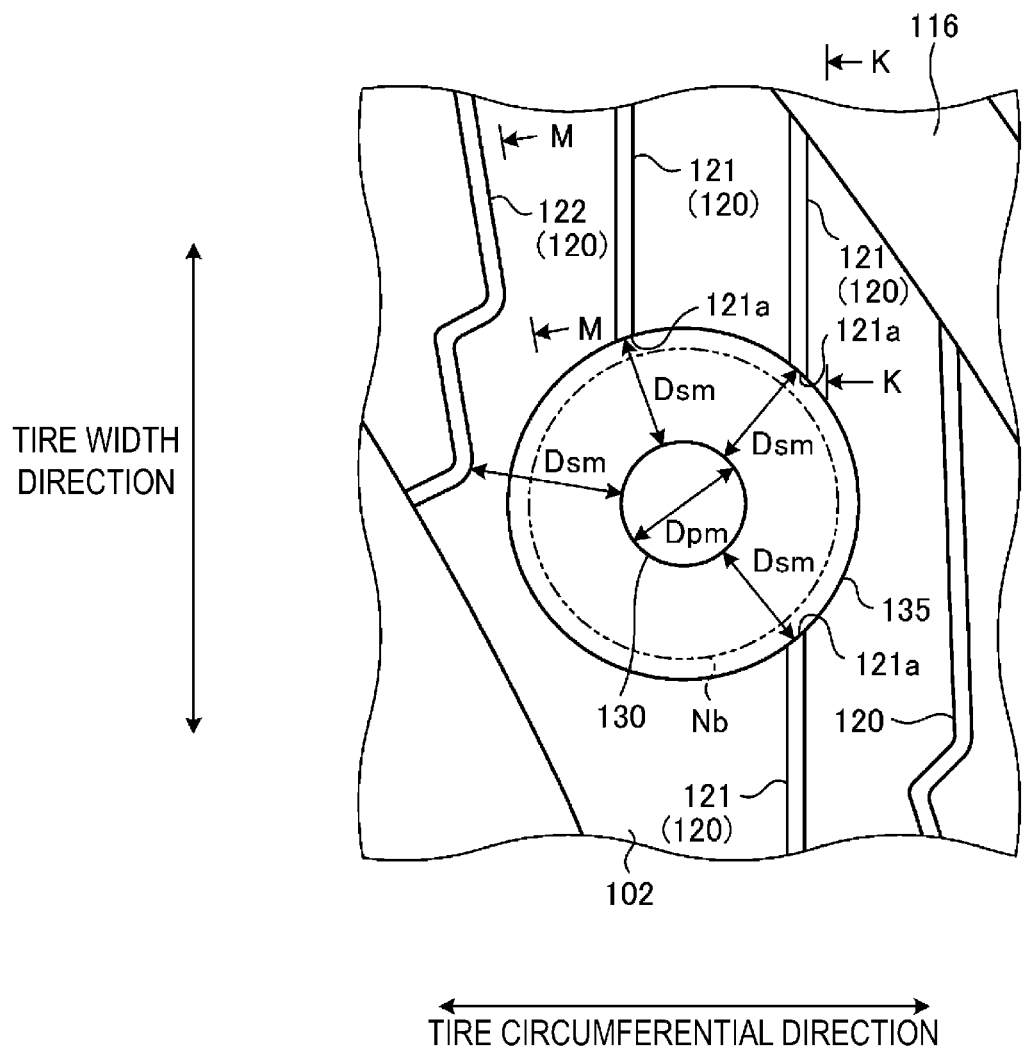
FIG. 8 is a detailed view of portion J of FIG. 7.

FIG. 8 is a detailed view of the portion J in FIG. 7. FIG. 8 illustrates the mold pin 130 and the mark forming portion 135 in a simplified manner so that the positional relationship between the sipe blade 120 and the mold pin 130 can be easily understood. The plurality of sipe blades 120 disposed in the tread molding surface 102 are disposed at positions where the distance Dsm from the mold pin 130 and the diameter Dpm of the mold pin 130 satisfy a relationship of (Dsm/Dpm)≥4.0. That is, the sipe blade 120 is not disposed within a range from the mold pin 130 that is 4.0 times the diameter Dpm of the mold pin 130, and the region within this range is the region Nb where the sipe blade 120 is not present. Note that in this case, the diameter Dpm of the mold pin 130 is the diameter at the base of the mold pin 130 that is disposed in a substantially circular shape with respect to the tread molding surface 102.

In addition, a pin neighboring blade 121 which is the sipe blade 120 disposed at or near the mold pin 130 among the plurality of sipe blades 120 is formed in a high rigidity shape having higher rigidity than a normal blade 122 which is the sipe blade 120 other than the pin neighboring blade 121 disposed at or near the pin neighboring blade 121.

The pin neighboring blade 121 here is the sipe blade 120 in which the distance Dsm from the mold pin 130 and the diameter Dpm of the mold pin 130 satisfy a relationship of (Dsm/Dpm)≤5.0 among the plurality of sipe blades 120. That is, the pin neighboring blade 121 is the sipe blade 120 in which that the distance Dsm from the mold pin 130, that is, the distance Dsm of the portion closest to the mold pin 130, and the diameter Dpm of the mold pin 130 satisfy a relationship of 4.0≤(Dsm/Dpm)≤5.0. Specifically, in the pin neighboring blade 121, the distance Dsm from the mold pin 130 of the end portion 121a in the length direction and the diameter Dpm of the mold pin 130 satisfy a relationship of 4.0≤(Dsm/Dpm)≤5.0. Note that the number of pin neighboring blades 121 corresponding to one mold pin 130 may be 0, or may be one or a plural.

In addition, the normal blade 122 is the sipe blade 120 of which the distance Dsm from the mold pin 130 is the smallest among the sipe blades 120 in which the distance Dsm from the mold pin 130 and the diameter Dpm of the mold pin 130 satisfy a relationship of (Dsm/Dpm)>5.0. That is, the normal blade 122 is the sipe blade 120 of which the distance Dsm from the mold pin 130 is the smallest among the sipe blades 120 other than the sipe blades 120 satisfying the definitions of the pin neighboring blade 121. The pin neighboring blade 121 is formed in a high rigidity shape having higher rigidity than the normal blade 122 defined in this way.

Figure 9:
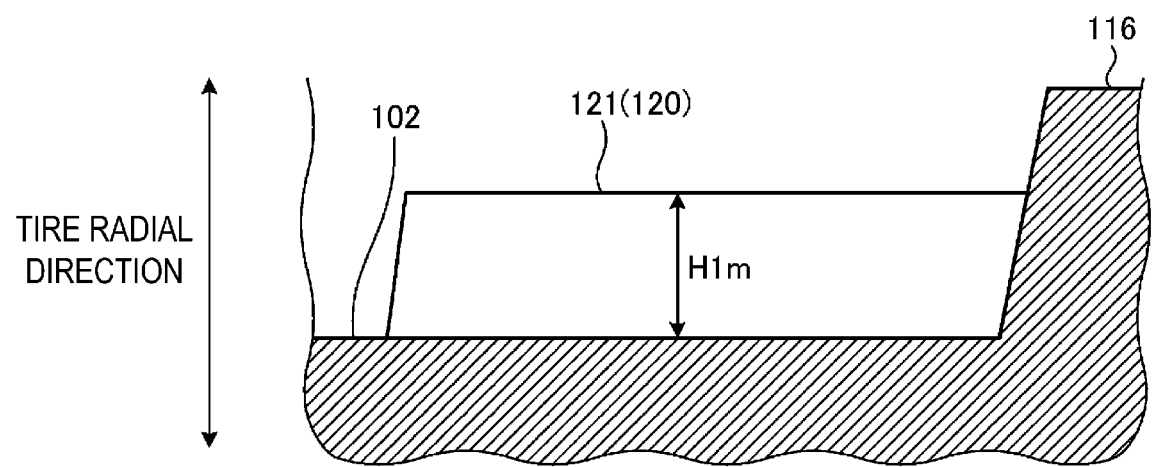
FIG. 9 is a view in the direction of arrow K-K in FIG. 8.
Figure 10:
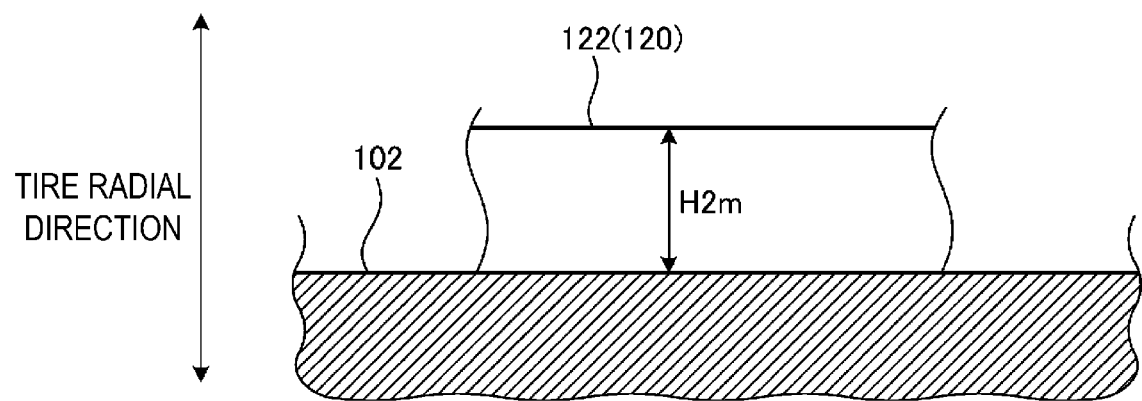
FIG. 10 is a view in the direction of arrow M-M in FIG. 8.

FIG. 9 is a view in the direction of arrow K-K of FIG. 8. FIG. 10 is a view in the direction of arrow M-M in FIG. 8. The pin neighboring blade 121 has a maximum height H1$m$ lower than the maximum height H2$m$ of the normal blade 122. As a result, the pin neighboring blade 121 has rigidity higher than the rigidity of the normal blade 122. Specifically, the pin neighboring blade 121 is configured such that a ratio of the maximum height H1$m$ of the pin neighboring blade 121 to the maximum height H2$m$ of the normal blade 122 is in the range of 0.3≤(H1$m$/H2$m$)≤0.8.

Note that in the present embodiment, the height of the sipe blade 120 in the tire radial direction from the tread molding surface 102 is in the range of 1 mm or more and 15 mm or less. Thus, both the maximum height H1$m$ of the pin neighboring blade 121 and the maximum height H2$m$ of the normal blade 122 are in the range of 1 mm or more and 15 mm or less. Moreover, the thickness of the sipe blade 120 is in the range of 0.2 mm or more and 1.0 mm or less.

Tire Manufacturing Method

Figure 11:
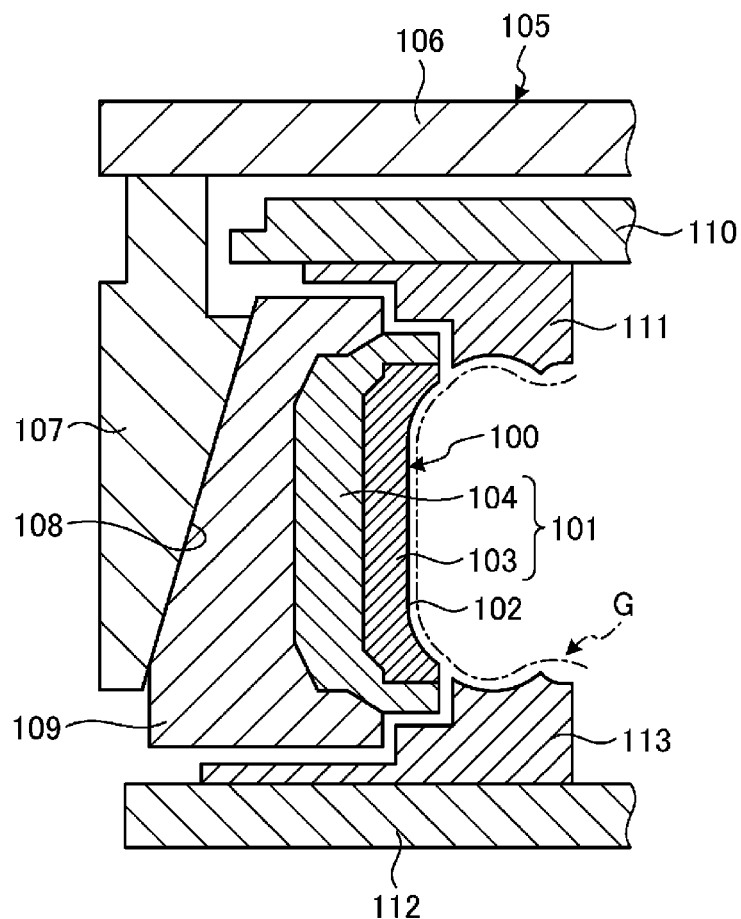
FIG. 11 is an explanatory diagram illustrating a tire manufacturing method using the tire molding mold illustrated in FIG. 6.

Now, a manufacturing method for the pneumatic tire 1 using the tire molding mold 100 according to an embodiment will be described. FIG. 11 is an explanatory diagram illustrating a tire manufacturing method using the tire molding mold 100 illustrated in FIG. 6. FIG. 11 illustrates an axial cross-sectional view of the mold support device 105 including the tire molding mold 100 illustrated in FIG. 6. The pneumatic tire 1 according to the present embodiment is manufactured in accordance with manufacturing steps described below.

First, various rubber members (not illustrated) that constitute the pneumatic tire 1, and members such as carcass plies (not illustrated) and belt plies (not illustrated) are applied to a molding machine to form a green tire G. Then, the green tire G is mounted on the mold support device 105 (see FIG. 11).

In FIG. 11, the mold support device 105 includes a support plate 106, an outer ring 107, a segment 109, a top plate 110 and a base plate 112, an upper side mold 111 and a lower side mold 113, and the tire molding mold 100. The support plate 106 has a disc shape and is disposed with the flat surface thereof to be horizontal. The outer ring 107 is an annular structure including a tapered surface 108 on an inner side in the radial direction, and is installed and suspended from a lower portion of an outer peripheral edge of the support plate 106. The segment 109 is a divisible annular structure corresponding to the sectors 101 of the tire molding mold 100 and is inserted into the outer ring 107 and disposed slidably in the axial direction relative to the tapered surface 108 of the outer ring 107. The top plate 110 is installed movably in the axial direction inside the outer ring 107 and between the segment 109 and the support plate 106. The base plate 112 is disposed below the support plate 106 and at a position opposite the support plate 106 in the axial direction.

The upper side mold 111 and the lower side mold 113 include molding surfaces with side profiles corresponding to both side surfaces of the pneumatic tire 1 in the tire width direction. Additionally, the upper side mold 111 and the lower side mold 113 are disposed such that the upper side mold 111 is attached to the lower surface side of the top plate 110, the lower side mold 113 is attached to the upper surface side of the base plate 112, and the molding surface of the upper side mold 111 faces the molding surface of the lower side mold 113. As described above, the tire molding mold 100 has a divisible annular structure (see FIG. 6) with the tread molding surface 102 enabling a tread profile to be formed. Additionally, each of the sectors 101 of the tire molding mold 100 are attached to the inner circumferential surfaces of the corresponding segments 109, and the tire molding mold 100 is disposed such that the tread molding surface 102 faces the side where the molding surfaces of the upper side mold 111 and the lower side mold 113 are located.

Then, the green tire G is mounted between the molding surface of the tire molding mold 100 and the molding surfaces of the upper side mold 111 and the lower side mold 113. At this time, the support plate 106 moves downward in the axial direction to move the outer ring 107 downward in the axial direction along with the support plate 106, and the tapered surface 108 of the outer ring 107 pushes the segments 109 radially inward. Then, the tire molding mold 100 is contracted in diameter to annularly connect the molding surfaces of the sectors 101 of the tire molding mold 100, and the entire molding surface of the tire molding mold 100 is connected to the molding surface of the lower side mold 113. Additionally, the top plate 110 moves downward in the axial direction to lower the upper side mold 111, reducing the distance between the upper side mold 111 and the lower side mold 113. Then, the entire molding surface of the tire molding mold 100 is connected to the molding surface of the upper side mold 111. Accordingly, the green tire G is surrounded and held by the molding surface of the tire molding mold 100, the molding surface of the upper side mold 111, and the molding surface of the lower side mold 113.

Then, the green tire G corresponding to an unvulcanized tire is subjected to vulcanization molding. Specifically, the tire molding mold 100 is heated, and the green tire G is expanded radially outward by a pressurizing device (not illustrated) and pressed against the tread molding surface 102 of the tire molding mold 100. Then, the green tire G is heated, and rubber molecules and sulfur molecules in the tread portion 2 are bonded together, leading to vulcanization. Then, the tread molding surface 102 of the tire molding mold 100 is transferred to the green tire G, forming the tread pattern in the tread portion 2.

Subsequently, the tire after vulcanization molding is acquired as a product tire corresponding to the pneumatic tire 1 to be provided as a product. At this time, the support plate 106 and the top plate 110 move upward in the axial direction to space the tire molding mold 100, the upper side mold 111, and the lower side mold 113 apart from one another, opening the mold support device 105. In response to opening of the mold support device 105, the tire detaches the tire molding mold 100 from the mold support device 105 with the tire subjected to vulcanization molding.

Figure 12:
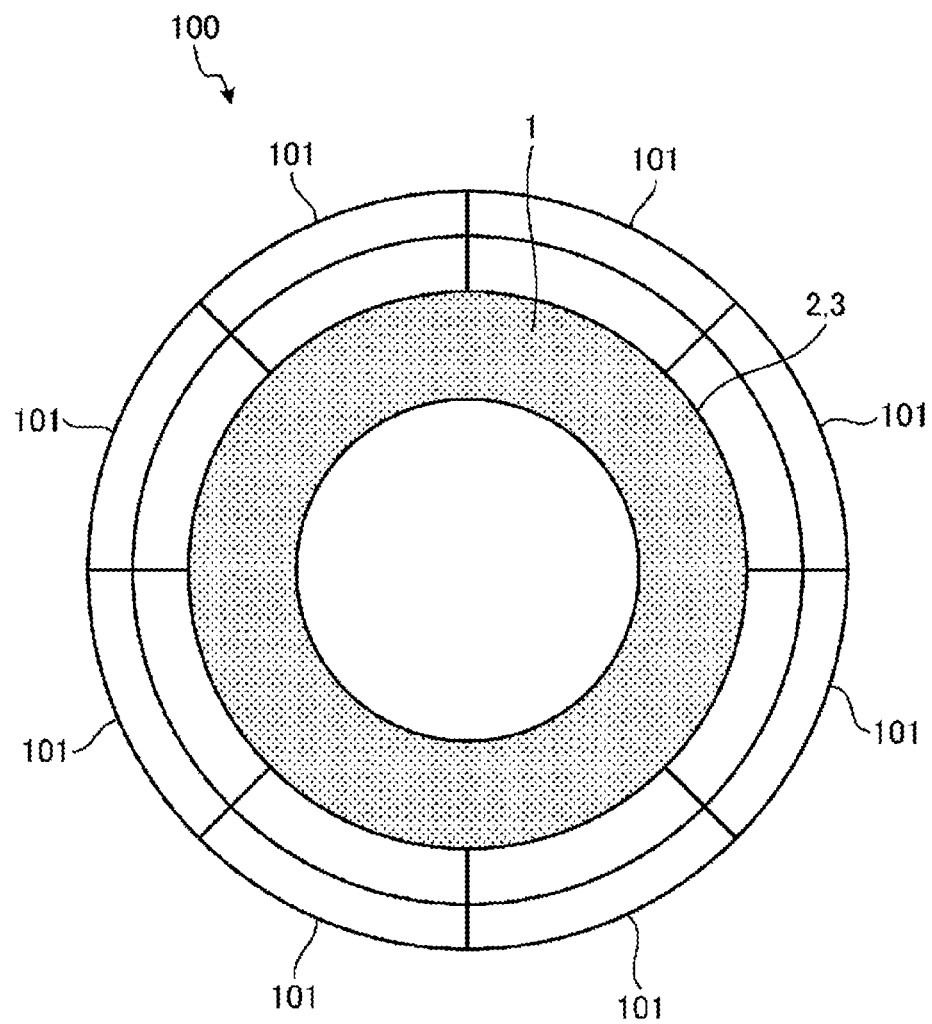
FIG. 12 is an explanatory diagram illustrating a state before the tire molding mold is detached from a pneumatic tire after vulcanization molding.

FIG. 12 is an explanatory diagram illustrating a state before the tire molding mold 100 is detached from the pneumatic tire 1 after vulcanization molding. During vulcanization molding of the pneumatic tire 1 using the tire molding mold 100, the tread portion 2 is formed by the tire molding mold 100. Thus, immediately after vulcanization molding is performed, the tire molding mold 100 is attached to the tread portion 2 of the pneumatic tire 1 (see FIG. 12). Specifically, the plurality of sectors 101 of the tire molding mold 100 are connected in an annular shape, and the tire molding mold 100 is attached to the tread portion 2 of the pneumatic tire 1 immediately after vulcanization molding is performed. In response to completion of the vulcanization molding of the pneumatic tire 1 and detachment of the tire molding mold 100 from the mold support device 105, the plurality of sectors 101 connected together in an annular shape and attached to the tread portion 2 of the pneumatic tire 1 are detached from the pneumatic tire 1. Accordingly, the tire molding mold 100 is detached from the pneumatic tire 1.

Figure 13:
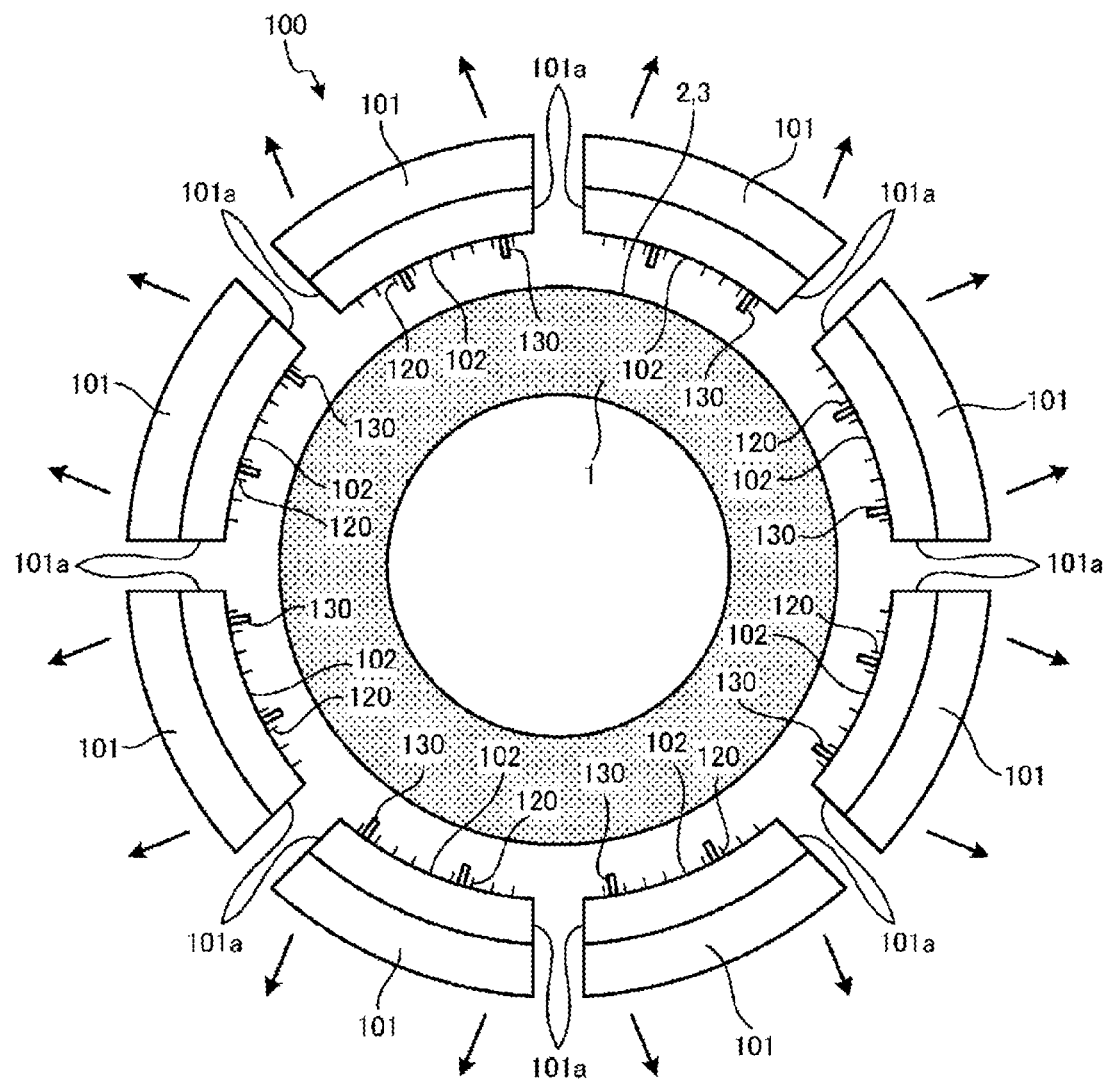
FIG. 13 is an explanatory diagram illustrating a state in which the tire molding mold is detached from the pneumatic tire after vulcanization molding.

FIG. 13 is an explanatory diagram illustrating a state in which the tire molding mold 100 is detached from the pneumatic tire 1 after vulcanization molding. In a case that the plurality of sectors 101 are detached from the pneumatic tire 1, the sectors 101 are moved toward the outer side in the tire radial direction and separated from the tread portion 2 of the pneumatic tire 1. Accordingly, the tire molding mold 100 is detached from the pneumatic tire 1. In this case, during vulcanization molding of the pneumatic tire 1, the plurality of sipe blades 120 disposed on the tread molding surfaces 102 of the sectors 101 of the tire molding mold 100 form a plurality of sipes 20 in the road contact surface 3 of the tread portion 2, and the plurality of mold pins 130 disposed on the tread forming surface 102 form a plurality of pin holes 30 in the road contact surface 3 of the tread portion 2. In response to detachment of the sectors 101 of the tire molding mold 100 from the pneumatic tire 1 by moving the sectors 101 toward the outer side in the tire radial direction, the plurality of sipe blades 120 and the plurality of mold pins 130 disposed on the sectors 101 are extracted from the sipes 20 and the pin holes 30 formed in the tread portion 2 of the pneumatic tire 1.

In this regard, the sipe blades 120 and the mold pins 130 disposed on the tread molding surfaces 102 of the sector 101 extend from the tread molding surfaces 102 generally toward the inner side in the tire radial direction. On the other hand, in a case of detaching the sectors 101 from the pneumatic tire 1, the sectors 101 are moved toward the outer side in the tire radial direction. Thus, in the sipe blade 120 and the mold pin 130 disposed in the tread molding surface 102, differences between the direction of extending from the tread molding surface 102 and the movement direction when the sector 101 is detached from the pneumatic tire 1 are different depending on the position in the tire circumferential direction on the tread molding surface 102 of the sector 101. For example, the sipe blade 120, among the plurality of sipe blades 120 disposed on one sector 101, disposed in a central region of the sector 101 in the tire circumferential direction has the direction in which the sipe blade 120 extends from the tread molding surface 102 being similar to the direction in which the sector 101 is moved.

In contrast, for the sipe blade 120, among the plurality of sipe blades 120 disposed on one sector 101, disposed at or near the division position 101a between the sectors 101 has the direction in which the sipe blade 120 extends from the tread molding surface 102 being inclined with respect to the direction in which the sector 101 is moved. In other words, in a case where the sectors 101 are detached from the pneumatic tire 1, one sector 101 is integrally moved, and thus, the direction in which the sector 101 is moved corresponds, even at or near the division position 101a between the sectors 101, to the identical direction as the direction in which a position in a central region of the sector 101 in the tire circumferential direction is moved toward the outer side in the tire radial direction. Thus, the direction of movement of the division position 101a between the sectors 101 during detachment of the sectors 101 from the pneumatic tire 1 differs from the tire radial direction, and thus, the direction in which the sipe blade 120 disposed at or near the division position 101a between the sectors 101 moves during detachment of the sectors 101 from the pneumatic tire 1 differs from the direction in which the sipe blades 120 extends from the tread molding surface 102.

Similarly, in the plurality of sipe blades 120 disposed in the tread molding surface 102, differences between the direction of extending from the tread molding surface 102 and the movement direction when the sector 101 is detached from the pneumatic tire 1 are different depending on the position in the tire circumferential direction on the tread molding surface 102 of the sector 101. Similarly, in the mold pins 130, differences between the direction of extending from the tread molding surface 102 and the movement direction when the sector 101 is detached from the pneumatic tire 1 are different depending on the position in the tire circumferential direction on the tread molding surface 102 of the sector 101.

In the sipe blade 120 and the mold pin 130, the differences between the direction of extending from the tread molding surface 102 and the movement direction of the sipe blade 120 and the mold pin 130 when the sector 101 is detached from the pneumatic tire 1 are different depending on the position in the tire circumferential direction on the tread molding surface 102 of the sector 101. However, the tread portion 2 of the pneumatic tire 1 is formed of a rubber member having elasticity. Thus, even when there are differences between the direction of extending from the tread molding surface 102 and the movement direction when the sector 101 is detached from the pneumatic tire 1, the rubber member around the sipe 20 formed by the sipe blade 120 and the pin hole 30 formed by the mold pin 130 elastically deforms, and thus the sipe blade 120 and the mold pin 130 can be pulled out of the sipe 20 and the pin hole 30.

That is, for example, when the movement direction of the sipe blade 120 and the depth direction of the sipe 20 formed by the sipe blade 120 are different, the force when moving the sector 101 acts on the sipe blade 120 in a direction different from the depth direction of the sipe 20. In this case, a reaction force from the sipe 20 acts on the sipe blade 120, but the sipe 20 is formed of a rubber member. And thus, the sipe blade 120 can move in a direction different from the depth direction of the sipe 20 due to the elastic deformation of the rubber member. Even when the movement direction of the sipe blade 120 is different from the depth direction of the sipe 20, the rubber member elastically deforms and thus the sipe blade 120 can be pulled out of the sipe 20.

On the other hand, when the distance between the sipe blade 120 and the mold pin 130 is small, the amount of the rubber member present between the sipe blade 120 and the mold pin 130 is reduced when the sector 101 is detached from the pneumatic tire 1. That is, when the distance between the plurality of pin holes 30 and the plurality of sipes 20 disposed in the land portion 15 of the pneumatic tire 1 is small, the amount of the rubber member present between the sipe 20 and the pin hole 30 is reduced. In this case, when the depth direction of the sipe 20 formed by the sipe blade 120 and the movement direction of the sipe blade 120 when the sector 101 is detached from the pneumatic tire 1 are different, the amount of the member that is elastically deformed around the sipe blade 120 is reduced.

Thus, when the sipe blade 120 is pulled out of the sipe 20 into which the sipe blade 120 is inserted, a large reaction force from the rubber member forming the sipe 20 acts on the sipe blade 120. In a case of detachment of the sectors 101 from the pneumatic tire 1, a reaction force from the rubber member forming the sipes 20 acts on the sipe blade 120 at a close distance from the mold pin 130, and is likely to cause failure such as bending or folding of the sipe blade 120 by the reaction force.

In contrast, in the pneumatic tire 1 according to the present embodiment, the pin hole neighboring sipe 21 in which the distance Ds from the pin hole 30 and the diameter Dp of the pin hole 30 satisfy a relationship of (Ds/Dp)≤5.0 is formed in a high rigidity shape having higher rigidity than the normal sipe 22 of which the distance Ds from the pin hole 30 is the smallest among the sipes 20 in which the distance Ds from the pin hole 30 and the diameter Dp from the pin hole 30 satisfy a relationship of (Ds/Dp)>5.0. That is, the pin hole neighboring sipe 21 has a high rigidity shape in which the rigidity of the entire groove formed by the wall surface and the bottom portion that forms the sipe 20 is higher than that of the normal sipe. In line with this, the sipe blade 120 that forms the pin hole neighboring sipe 21 has a high rigidity shape having higher rigidity than the sipe blade 120 that forms the normal sipe 22. Thus, when the sipe blade 120 that forms the pin hole neighboring sipe 21 in which the amount of the rubber member present between the pin hole 30 and the pin hole neighboring sipe 21 is small due to the small distance Ds from the pin hole 30 is pulled out of the pin hole neighboring sipe 21, even when a large reaction force from the rubber member forming the sipe 20 acts on the sipe blade 120, the occurrence of failures such as bending of the sipe blade 120 can be suppressed.

Additionally, since the sipes 20 are disposed at positions where the distance Ds from the pin hole 30 and the diameter Dp of the pin hole 30 satisfy a relationship of (Ds/Dp)≥4.0, it is possible to suppress the distance Ds from the pin hole 30 of any sipe 20 from becoming too small. As a result, it is possible to suppress the amount of the rubber member disposed between the sipe 20 and the pin hole 30 from becoming too small. Moreover, it is possible to suppress the occurrence of failures such as bending in the sipe blade 120 due to a reaction force acting from the rubber member forming the sipe 20 when the sipe blade 120 is pulled out of the sipe 20.

In addition, since the pin hole neighboring sipe 21 is formed in a high rigidity shape, and thus the sipes 20 can be disposed at or near the pin holes 30 while suppressing the occurrence of failures in the sipe blade 120, it is possible to dispose more sipes 20. Thus, the edge effect when traveling on snow-covered road surfaces or icy road surfaces can be improved. The state of the pneumatic tire 1 when the pneumatic tire 1 is mounted on a vehicle and the vehicle travels will be described. When the pneumatic tire 1 is mounted on a vehicle, the pneumatic tire 1 is mounted on a rim wheel, inflated with air, and then mounted on the vehicle in an inflated state. When the vehicle on which the pneumatic tires 1 are mounted travels, the pneumatic tires 1 each rotate while a bottom portion of the road contact surface 3 of the tread portion 2 comes into contact with the road surface. When traveling on dry road surfaces, the vehicle on which the pneumatic tires 1 are mounted travels by, mainly with friction force between the road contact surface 3 and the road surfaces, transmitting driving force and braking force to the road surfaces and generating turning force. Additionally, during traveling on wet road surfaces, water between the road contact surface 3 and the road surfaces enters the grooves 10 such as the circumferential grooves 11 and the lug grooves 12 and the sipes 20, and the vehicle travels while the water between the road contact surface 3 and the road surfaces is drained through the grooves 10 and the sipes 20. As a result, the ground contact surface 3 is easily brought into contact with the road surfaces, and the vehicle can travel with friction force between the road contact surface 3 and the road surfaces.

When a vehicle travels on snow-covered road surfaces or icy road surfaces, the vehicle travels using the edge effect of the circumferential groove 11, the lug grooves 12, and the sipes 20. In other words, when a vehicle travels on snow-covered road surfaces or icy road surfaces, the vehicle travels using the resistance caused by the edges of the circumferential groove 11, the edges of the lug grooves 12, and the edges of the sipes 20 biting the snow or ice surface. Furthermore, in the pneumatic tire 1 according to the present embodiment, when the vehicle travels on snow-covered road surfaces or icy road surfaces, stud pins (not illustrated) are inserted into the pin holes 30, and thus the vehicle can travel using the resistance resulting from the stud pins biting the snow or ice surfaces. When the vehicle travels on snow-covered road surfaces or icy road surfaces, the resistance between the snow-covered road surfaces or the icy road surface and the road contact surface 3 can be increased due to the edge effects and the resistance resulting from the stud pins biting the snow or ice surfaces, and the running performance of the vehicle having the pneumatic tire 1 mounted thereon can be ensured.

Since the edge effect of the sipe 20 is also effective in ensuring the running performance during traveling on snow-covered road surfaces and icy road surfaces, it is effective to dispose as many sipes 20 as possible in the road contact surface 3. However, when the pin holes 30 for stud pins are formed in the road contact surface 3, failures are likely to occur in the sipe blade 120 that forms the sipe 20 of which the distance to the pin hole 30 is small. Thus, it is difficult to dispose the sipe 20 at or near the pin hole 30. However, in the present embodiment, the pin hole neighboring sipe 21 is more rigid than the normal sipe 22, and failures are less likely to occur in the sipe blade 120 that forms the pin hole neighboring sipe 21. As a result, the sipes 20 can be disposed at or near the pin holes 30, and more sipes 20 can be disposed in the road contact surface 3. Accordingly, the edge components of the sipe 20 can be increased to increase the edge effect, and the performance on ice and snow can be ensured. As a result, the durability of the sipe blades 120 and the performance on ice and snow can be provided in a compatible manner.

Additionally, the maximum depth H1 of the pin hole neighboring sipe 21 is shallower than the maximum depth H2 of the normal sipe 22. And thus, the rigidity of the entire groove formed by the wall surface and the bottom portion that forms the pin hole neighboring sipe 21 can be more reliably increased as compared to the rigidity of the entire groove formed by the wall surface or the bottom portion that forms the normal sipe 22. As a result, it is possible to more reliably suppress failures such as bending of the sipe blade 120 generated due to the reaction force acting to the sipe blade 120 from the rubber member forming the sipe 20 when the sipe blade 120 that forms the pin hole neighboring sipe 21 in which the amount of the rubber member disposed between the pin hole 30 and the pin hole neighboring sipe 21 is small is pulled out of the pin hole neighboring sipe 21. As a result, the durability of the sipe blades 120 and the performance on ice and snow can be provided more reliably in a compatible manner.

In addition, since the ratio of the maximum depth H1 of the pin hole neighboring sipe 21 to the maximum depth H2 of the normal sipe 22 is within the range of 0.3≤(H1/H2)≤0.8, it is possible to more reliably provide the durability of the sipe blade 120 and the performance on ice and snow. That is, when the ratio of the maximum depth H1 of the pin hole neighboring sipe 21 to the maximum depth H2 of the normal sipe 22 is (H1/H2)<0.3, since the maximum depth H1 of the pin hole neighboring sipe 21 is too shallow, the pin hole neighboring sipe 21 may wear prematurely. In this case, since the edge components are reduced, the performance on ice and snow may deteriorate prematurely. Additionally, when the maximum depth H1 of the pin hole neighboring sipe 21 is too shallow, the pin hole neighboring sipe 21 may wear prematurely as compared to other sipes 20, the appearance may degrade. In addition, when the ratio of the maximum depth H1 of the pin hole neighboring sipe 21 to the maximum depth H2 of the normal sipe 22 is (H1/H2)>0.8, since the maximum depth H1 of the pin hole neighboring sipe 21 is too deep, it may be difficult to form the pin hole neighboring sipe 21 in a shape having higher rigidity than the shape of the normal sipe 22. In this case, since it is difficult to increase the rigidity of the sipe blade 120 that forms the pin hole neighboring sipe 21, it may be difficult to suppress failures such as bending of the sipe blade 120 by the force acting from the rubber member forming the sipe 20 to the sipe blade 120 when the sipe blade 120 that forms the pin hole neighboring sipe 21 in which the amount of the rubber member disposed between the pin hole 30 and the sipe blade 120 is small is pulled out of the pin hole neighboring sipe 21.

In contrast, when the ratio of the maximum depth H1 of the pin hole neighboring sipe 21 to the maximum depth H2 of the normal sipe 22 is in the range of $0.3 \leq (H1/H2) \leq 0.8$, the depth of the pin hole neighboring sipe 21 can be ensured. Thus, the edge effect of the pin hole neighboring sipe 21 can be ensured continuously, and degradation of the appearance when the tread portion 2 wears can be suppressed. Furthermore, the pin hole neighboring sipe 21 can be more reliably formed in a shape that is more rigid than the shape of the normal sipe 22, and the rigidity of the sipe blade 120 that forms the pin hole neighboring sipe 21 can be more reliably increased. Thus, failures of the sipe blade 120 can be more reliably suppressed. As a result, the durability of the sipe blades 120 and the performance on ice and snow can be provided more reliably in a compatible manner.

Additionally, in the tire molding mold 100 according to the present embodiment, the pin neighboring blade 121 in which the distance Dsm from the mold pin 130 and the diameter Dpm of the mold pin 130 satisfy a relationship of (Dsm/Dpm)≤5.0 is formed in a high rigidity shape having higher rigidity than the normal blade 122 of which the distance Dsm from the mold pin 130 is the smallest among the sipe blades 120 in which the distance Dsm from the mold pin 130 and the diameter Dpm of the mold pin 130 satisfy a relationship of (Dsm/Dpm)>5.0. Thus, during vulcanization molding of the pneumatic tire 1, when the pin neighboring blade 121 in which the amount of the rubber member of the tread portion 2 disposed between the mold pin 130 and the pin neighboring blade 121 is small due to the small distance Dsm from the mold pin 130 is pulled out of the pin hole neighboring sipe 21 formed by the pin neighboring blade 121, even when a large reaction force acts on the pin neighboring blade 121 from the rubber member, the occurrence of failures such as bending of the pin neighboring blade 121 can be suppressed.

Additionally, since the sipe blades 120 are disposed at positions where the distance Dsm from the mold pin 130 and the diameter Dpm of the mold pin 130 satisfy a relationship of (Dsm/Dpm)≥4.0, it is possible to suppress the distance Dsm from the mold pin 130 of any sipe blade 120 from becoming too small. As a result, it is possible to suppress the amount of the rubber member disposed between the sipe blade 120 and the mold pin 130 from becoming too small during vulcanization molding of the pneumatic tire 1. Moreover, it is possible to suppress the occurrence of failures such as bending in the sipe blade 120 due to a reaction force acting from the rubber member forming the sipe 20 when the sipe blade 120 is pulled out of the sipe 20.

In addition, since the pin neighboring blade 121 has higher rigidity than the normal blade 122, failures are less likely to occur. Thus, when the pin neighboring blades 121 are disposed at or near the mold pins 130, the sipe blades 120 can also be disposed at or near the mold pins 130, and more sipe blades 120 can be disposed on the tread molding surface 102. And thus, more sipes 20 can be disposed in the road contact surface 3 of the pneumatic tire 1. Accordingly, when vulcanization molding of the pneumatic tire 1 is performed using the tire molding mold 100 according to the present embodiment, the edge components of the sipe 20 can be increased, and thus the edge effect can be improved. And thus, the performance on ice and snow of the pneumatic tire 1 can be ensured. As a result, the durability of the sipe blades 120 and the performance on ice and snow can be provided in a compatible manner.

Modified Examples

Figure 14:
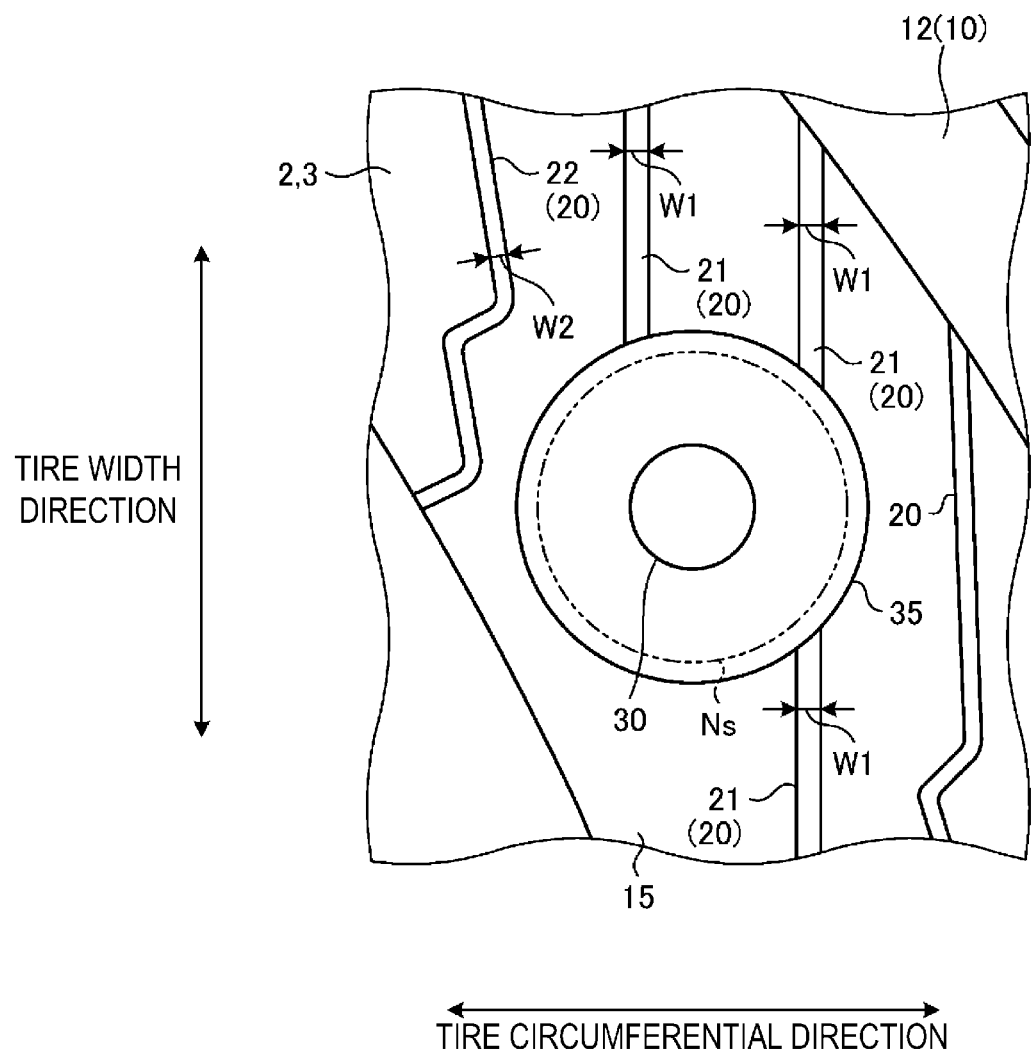
FIG. 14 is an explanatory diagram of a modified example of the pneumatic tire according to an embodiment, illustrating a case where the sipe widths are different.

Note that in the embodiment described above, the pin hole neighboring sipe 21 of the pneumatic tire 1 is formed in a high rigidity shape having higher rigidity than the normal sipe 22 by making the maximum depth H1 shallower than the maximum depth H2 of the normal sipe 22. However, the pin hole neighboring sipe 21 may have a higher rigidity shape without making the depth shallower than the normal sipe 22. FIG. 14 is a modified example of the pneumatic tire 1 according to the embodiment, and is an explanatory diagram in a case where the width of the sipe 20 is different. The pin hole neighboring sipe 21 may be formed such that the maximum width W1 of the pin hole neighboring sipe 21 is greater than the maximum width W2 of the normal sipe 22, for example, and thus the shape of the pin hole neighboring sipe 21 is more rigid than the normal sipe 22. In this case, the ratio of the maximum width W1 of the pin hole neighboring sipe 21 to the maximum width W2 of the normal sipe 22 is preferably in the range of $1.1 \leq (W1/W2) \leq 1.5$.

That is, when the ratio of the maximum width W1 of the pin hole neighboring sipe 21 to the maximum width W2 of the normal sipe 22 is (W1/W2)<1.1, the maximum width W1 of the pin hole neighboring sipe 21 is not significantly greater than the maximum width W2 of the normal sipe 22, and thus it may be difficult to form the pin hole neighboring sipe 21 in a shape that can effectively improve the rigidity. In this case, during vulcanization molding of the pneumatic tire 1, it may be difficult to effectively suppress the occurrence of failures such as bending in the sipe blade 120 that forms the pin hole neighboring sipe 21. In addition, when the ratio of the maximum width W1 of the pin hole neighboring sipe 21 to the maximum width W2 of the normal sipe 22 is (W1/W2)>1.5, the maximum width W2 of the normal sipe 22 is too narrow, and thus it may be difficult to exhibit the edge effect of the normal sipe 22.

In contrast, when the ratio of the maximum width W1 of the pin hole neighboring sipe 21 to the maximum width W2 of the normal sipe 22 is in the range of $1.1 \leq (W1/W2) \leq 1.5$, it is possible to form the pin hole neighboring sipe 21 in a shape that can more reliably increase the rigidity while ensuring the edge effect of the normal sipe 22 and suppress failures of the sipe blade 120 that forms the pin hole neighboring sipe 21. As a result, the durability of the sipe blades 120 and the performance on ice and snow can be provided more reliably in a compatible manner.

Additionally, the pin hole neighboring sipe 21 may be formed oscillating in the width direction in the depth direction, and thus formed in a shape having higher rigidity than the normal sipe 22. That is, the pin hole neighboring sipe 21 may be formed as a so-called three-dimensional sipe that oscillates in the width direction of the sipe 20 with respect to both the length direction and the depth direction of the sipe 20. When the pin hole neighboring sipe 21 is formed as a three-dimensional sipe, the pin hole neighboring sipe 21 includes a wall surface having a bent shape with an amplitude in the width direction of the sipe 20 in both a cross-sectional view in which the length direction of the sipe is a normal direction and a cross-sectional view in which the depth direction of the sipe 20 is a normal direction. When the normal sipe 22 is formed as a so-called two-dimensional sipe and the pin hole neighboring sipe 21 is formed as a three-dimensional sipe, the pin hole neighboring sipe 21 can be more reliably formed in a shape having higher rigidity than the normal sipe 22. As a result, the durability of the sipe blades 120 and the performance on ice and snow can be provided more reliably in a compatible manner. In this case, the two-dimensional sipe refers to the sipe 20 including a wall surface having a straight shape in any cross-sectional view (cross-sectional views including the width direction and the depth direction of the sipe 20) in which the length direction of the sipe 20 is a normal direction.

Figure 15A:
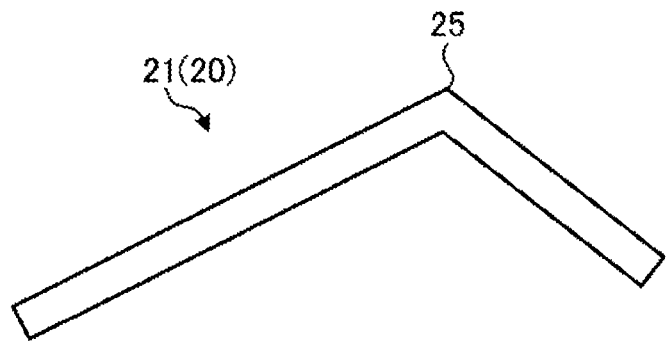
FIGS. 15A-15C are explanatory diagrams of a modified example of the pneumatic tire according to an embodiment, illustrating bending of a pin hole neighboring sipe.
Figure 15B:
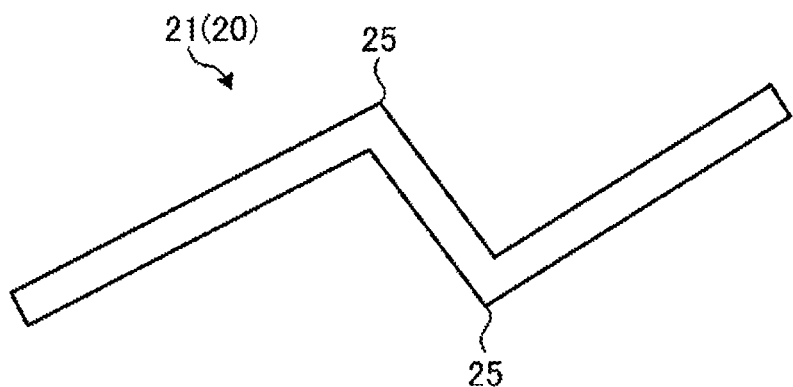
Figure 15C:
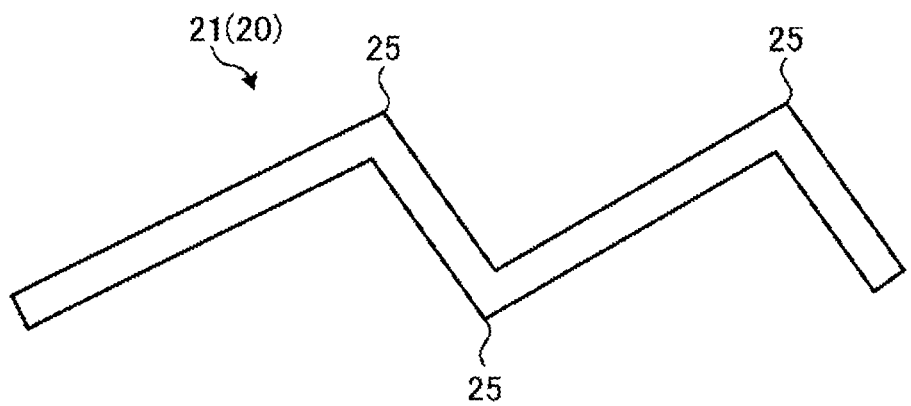

In the pneumatic tire 1 according to the embodiment described above, the pin hole neighboring sipe 21 formed in a shape having higher rigidity than the normal sipe 22 is not defined in detail, but may be some of the plurality of pin hole neighboring sipes 21. FIGS. 15A-15C are explanatory diagrams of a modified example of the pneumatic tire 1 according to the embodiment, illustrating bending of the pin hole neighboring sipe 21. Only the pin hole neighboring sipes 21 in which the number of bend points in the length direction of the pin hole neighboring sipe 21 is less than three among the plurality of pin hole neighboring sipes 21 may be formed in a high rigidity shape. That is, even when the pin hole neighboring sipes 21 are bent or not bent in a plan view, only the pin hole neighboring sipes 21 in which there is one bend point 25 as illustrated in FIG. 15A or there are two bend points 25 as illustrated in FIG. 15B may be formed in a high rigidity shape. That is, when the pin hole neighboring sipe 21 has three bend points 25 as illustrated in FIG. 15C or has four or more bend points, the pin hole neighboring sipe 21 may not be formed in a high rigidity shape. For example, the maximum depth H1 of the pin hole neighboring sipe 21 having three or more bend points 25 may not be shallower than the maximum depth H2 of the normal sipe 22.

When the pin hole neighboring sipe 21 has three or more bend points 25, the sipe blade 120 that forms the pin hole neighboring sipe 21 also has three or more bend points and thus the rigidity of the sipe blade 120 can be ensured. And thus, the occurrence of failures such as bending of the sipe blade 120 can be suppressed. In addition, by making the maximum depth H1 of the pin hole neighboring sipe 21 having three or more bend points 25 approximately equal to, rather than shallower than, the maximum depth H2 of the normal sipe 22, it is possible to suppress the premature wearing of the pin hole neighboring sipe 21. As a result, the edge effect of the pin hole neighboring sipe 21 can be ensured for the identical period as the normal sipe 22. As a result, the durability of the sipe blades 120 and the performance on ice and snow can be provided more reliably in a compatible manner.

Figure 16:
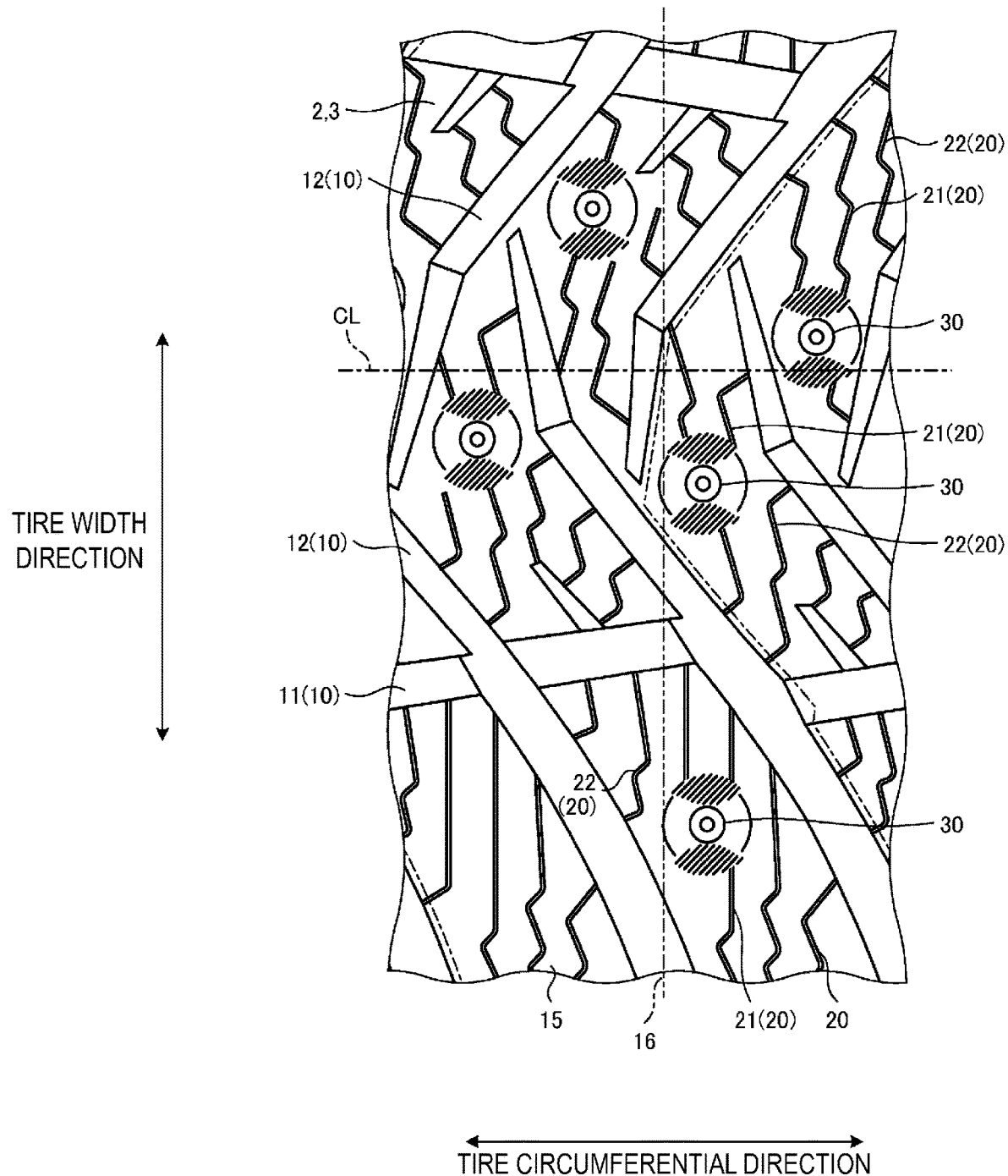
FIG. 16 is an explanatory diagram of a modified example of the pneumatic tire according to an embodiment, illustrating the vicinity of a sector dividing position.

In addition, when some pin hole neighboring sipes 21 are formed in a high rigidity shape, the pin hole neighboring sipes 21 to be formed in a high rigidity shape may be set in consideration of the division positions 101a between the sectors 101 of the tire molding mold 100 in the land portion 15. FIG. 16 is an explanatory diagram of a modified example of a pneumatic tire 1 according to the embodiment, illustrating the vicinity of the division position of the sector 101. The tread portion 2 of the pneumatic tire 1 is formed in a state where a plurality of sectors 101 (see FIG. 6) of the tire forming mold 100 (see FIG. 6) are connected in an annular shape in the tire circumferential direction. In this case, the pin hole neighboring sipes 21 located at or near the positions corresponding to the division positions 101a (see FIG. 6) between the sectors 101 of the tire molding mold 100 in the land portion 15 among the plurality of pin hole neighboring sipes 21 disposed in the tread portion 2 may be formed in a high rigidity shape. That is, when the positions corresponding to the division positions 101a between the sectors 101 of the tire molding mold 100 in the landing position 15, that is, the positions facing the division positions 101a, are division corresponding positions 16, only the pin hole neighboring sipes 21 located at or near the division corresponding positions 16 among the plurality of pin hole neighboring sipes 21 may be formed in a shape that has higher rigidity than the normal sipe 22.

Here, at or near the division corresponding position 16 refers to a range of 50 mm or less from the division corresponding position 16 in the tire circumferential direction. Thus, only the pin hole neighboring sipes 21 of which at least a portion is located in the range of 50 mm or less from the division corresponding positions 16 among the plurality of pin hole neighboring sipes 21 are preferably formed in a high rigidity shape.

In the sipe blade 120 disposed at or near the division position 101a of the sector 101 among the plurality of sipe blades 120 disposed in one sector 101, the difference between the direction of moving the sector 101 when the tire molding mold 101 is detached after vulcanization molding of the pneumatic tire 1 and the direction of the sipe blade 120 extending from the tread molding surface 102 is larger than the sipe blades 120 disposed at a position away from the division position 101a. That is, in the sipe blade 120 disposed at or near the division position 101a of the sector 101, an inclination angle of the sipe blade 120 with respect to the direction of moving the sector 101 is larger than that of the sipe blades 120 disposed at a position away from the division position 101a. Thus, the sipe blade 120 disposed at or near the division position 101a of the sector 101 receives a larger reaction force acting from the sipe 20 when the tire molding mold 100 is detached from the pneumatic tire 1 than the sipe blade 120 disposed at a position away from the division position 101a of the sector 101.

Accordingly, when only some pin hole neighboring sipes 21 are to be formed in a shape having higher rigidity than the normal sipes 22, by forming only the pin hole neighboring sipes 21 located at or near the division corresponding positions 16 in a high rigidity shape, it is possible to ensure the rigidity of the sipe blade 120 in which the reaction force acting from the sipe 20 when the tire molding mold 100 is detached from the pneumatic tire 1 is particularly large. Accordingly, it is possible to suppress the occurrence of failures such as bending of the sipe blades 120. Additionally, by making the maximum depth H1 of the pin hole neighboring sipe 21 located away from the division corresponding position 16 approximately equal to, rather than shallower than, the maximum depth H2 of the normal sipe 22, the premature wearing of the pin hole neighboring sipe 21 can be suppressed, and the edge effect of the pin hole neighboring sipe 21 can be ensured for the identical period as the normal sipe 22. As a result, the durability of the sipe blades 120 and the performance on ice and snow can be provided more reliably in a compatible manner.

Additionally, in the tire molding mold 100 of the embodiment described above, the plurality of sipe blades 120 included in the tire molding mold 100 are all made of an identical material, but the material may vary between sipe blades 120 as necessary. The pin neighboring blade 121 and the normal blade 122 may differ from each other in material such that, for example, the relationship between the material strength S1 of the pin neighboring blade 121 and the material strength S2 of the normal blade 122 is S2<S1. In this case, the material strength S1 of the pin neighboring blade 121 and the material strength S2 of the normal blade 122 may be, for example, the tensile strength and hardness of the material forming the pin neighboring blade 121 and the normal blade 122. Thus, in a case where, for example, tensile strength is used as the material strength compared between the pin neighboring blade 121 and the normal blade 122, the tensile strength of the material forming the pin neighboring blade 121 is preferably greater than the tensile strength of the material forming the normal blade 122.

In this way, the relationship between the material strength S1 of the pin neighboring blade 121 and the material strength S2 of the normal blade 122 is S2<S1, thus allowing the pin neighboring blade 121 to be reliably made more rigid than the normal blade 122. Accordingly, failures in the pin neighboring blade 121 such as bending and folding of the pin neighboring blade 121 can be reliably suppressed. As a result, the durability of the sipe blades 120 can be reliably improved.

Additionally, the pin neighboring blade 121 and the normal blade 122 preferably have a relationship between the surface roughness R1 of the pin neighboring blade 121 and the surface roughness R2 of the normal blade 122 being R2>R1. In this case, as the surface roughness R1 of the pin neighboring blade 121 and the surface roughness R2 of the normal blade 122, so-called arithmetic mean roughness Ra is used, for example. Because the surface roughness R1 of the pin neighboring blade 121 is smaller than the surface roughness R2 of the normal blade 122, frictional resistance offered in response to pullout of the pin neighboring blade 121 from the sipe 20 can be made smaller than the frictional resistance offered in response to pullout of the normal blade 122 from the sipe 20. Thus, in a case where the sectors 101 of the tire molding mold 100 are detached from the pneumatic tire 1 after vulcanization molding, the pin neighboring blade 121 can be easily pulled out from the sipe 20, and even in a case where the reaction force from the rubber member forming the sipe 20 acts on the pin neighboring blade 121, failure such as bending and folding of the pin neighboring blade 121 can be reliably suppressed. As a result, the durability of the sipe blades 120 can be reliably improved.

Additionally, in the pneumatic tire 1 according to the embodiment described above, the position of the end portion 21a in the length direction of the pin hole neighboring sipe 21 is closest to the pin hole 30, but the position other than the end portion 21a of the pin hole neighboring sipe 21 may be disposed closest to the pin hole 30. Additionally, the pneumatic tire 1 may include the pin hole 30 and the sipe 20 disposed in the tread portion 2, and the tread pattern is not limited to that illustrated in the embodiment.

Examples

FIG. 17 is a table showing results of performance evaluation tests of pneumatic tires. Hereinafter, evaluation tests of performance of the pneumatic tire 1 described above performed on pneumatic tires of Conventional Examples and the pneumatic tires 1 according to the embodiments of the present technology will be described. The performance evaluation tests were conducted for the durability of the tire molding mold when the pneumatic tire was subjected to vulcanization molding, and the performance on ice and snow, which is the running performance on icy and snowy road surfaces.

The performance evaluation tests were conducted on a pneumatic tire having a tire nominal size of 205/55R16 94T, defined by JATMA. The evaluation method for the respective test items is as follows. The durability of the tire molding mold was evaluated as follows. Vulcanization molding of test tires was performed using the tire molding mold. After that, bending of the pin neighboring blade 121 which is the sipe blade 120 for the pin hole neighboring sipe 21 and is the sipe blade 120 where bending is likely to occur was examined. The pin neighboring blades 121 which were bent by 10° or more were repaired, and the number of repaired pin neighboring blades 121 was measured. Furthermore, after vulcanization molding was performed 5000 times, the total number of the pin neighboring blades 121 repaired was calculated, and the reciprocals of the totals calculated were expressed as index values with the Conventional Example being assigned the value of 100. Larger values indicate a smaller number of the pin neighboring blades 121 repaired and superior mold durability.

Additionally, the performance on ice and snow was evaluated as follows. The test tires mounted on the rim wheels were mounted on a test vehicle, and the braking distances from starting braking at a speed of 20 km/h to reading 0 km/h were measured on a test course of icy road surfaces. The reciprocals of the measured braking distances were expressed as index values with Conventional Example being assigned the value of 100 Larger index values indicate shorter braking distance on icy road surfaces and superior braking performance on icy road surfaces. Note that, about performance on ice and snow, when the index value is 95 or more, a decrease in braking performance on icy road surfaces is suppressed as compared with Conventional Example.

The performance evaluation test was carried out on 9 types of pneumatic tires, or in other words, the pneumatic tires of Conventional Example which was an example of a conventional pneumatic tire, and Examples 1 to 8, which were the pneumatic tires 1 according to the present technology. Among these tires, in Conventional Example, the pin hole neighboring sipe 21 is not formed in a high rigidity shape having higher rigidity than the normal sipe 22, and the pin hole neighboring sipe 21 and the normal sipe 22 have the identical reference depth and width.

In contrast, in Examples 1 to 8, which are examples of the pneumatic tire 1 according to the present technology, all pin hole neighboring sipes 21 are formed in a high rigidity shape having higher rigidity than the normal sipes 22. Furthermore, in the pneumatic tires 1 according to Examples 1 to 8, the ratios (H1/H2) of the maximum depth H1 of the pin hole neighboring sipe 21 to the maximum depth H2 of the normal sipe 22, the ratios (W1/W2) of the maximum width W1 of the pin hole neighboring sipe 21 to the maximum width W2 of the normal sipe 22, the shapes of the pin hole neighboring sipes 21, whether only the pin hole neighboring sipe 21 in which the number of bend points 25 is less than three will be formed in a high rigidity shape, and whether only the pin hole neighboring sipe 21 located at or near the division corresponding position 16 will be formed in a high rigidity shape are respectively different.

The results of the performance evaluation tests using these pneumatic tire 1 indicate that, as shown in FIG. 17, the pneumatic tire 1 according to Examples 1 to 8 can suppress the occurrence of bending of the pin neighboring blade 121 that forms the pin hole neighboring sipe 21 and improve the durability of the pin neighboring blade 121 while suppressing a decrease in the braking performance on icy and snowy road surfaces as compared to Conventional Example. In other words, the pneumatic tires 1 according to Examples 1 to 8 can provide the durability of the sipe blade 120 and the performance on ice and snow in a compatible manner.

The invention claimed is:

1. A pneumatic tire comprising:
a plurality of sipes disposed in a land portion formed in a tread portion; and
a plurality of pin holes for stud pins disposed in the land portion,
the plurality of sipes being disposed at positions where a distance Ds from the pin hole and a diameter Dp of the pin hole satisfy a relationship of (Ds/Dp)≥4.0,
a pin hole neighboring sipe, among the plurality of sipes, in which the distance Ds from the pin hole and the diameter Dp of the pin hole satisfying a relationship of (Ds/Dp)≤5.0,
among one or more sipes, of the plurality of sipes, in which the distance Ds from the pin hole and the diameter Dp of the pin hole satisfy a relationship of (Ds/Dp)>5.0, a normal sipe being defined in which the distance Ds from the pin hole is smallest,
the pin hole neighboring sipe being formed in a high rigidity shape having higher rigidity than the normal sipe, and
a maximum depth of the pin hole neighboring sipe being shallower than a maximum depth of the normal sipe.

2. The pneumatic tire according to claim 1, wherein a ratio of a maximum depth H1 of the pin hole neighboring sipe to a maximum depth H2 of the normal sipe is in a range of 0.3≤(H1/H2)≤0.8.

3. The pneumatic tire according to claim 1, wherein a ratio of a maximum width W1 of the pin hole neighboring sipe to a maximum width W2 of the normal sipe is in a range of 1.1≤(W1/W2)≤1.5.

4. The pneumatic tire according to claim 1, wherein the pin hole neighboring sipe is formed oscillating in a width direction in a depth direction.

5. The pneumatic tire according to claim 1, wherein only the pin hole neighboring sipe, in which the number of bend points is less than three in a length direction of the pin hole neighboring sipe among the plurality of pin hole neighboring sipes, is formed in the high rigidity shape.

6. The pneumatic tire according to claim 1,
the pneumatic tire being molded by a tire molding mold comprising a plurality of sectors divided in a tire circumferential direction, and
only the pin hole neighboring sipe, among the plurality of pin hole neighboring sipes, located at or near a position corresponding to a division position between the sectors of the tire molding mold in the land portion, being formed in the high rigidity shape.

7. The pneumatic tire according to claim 2, wherein a ratio of a maximum width W1 of the pin hole neighboring sipe to a maximum width W2 of the normal sipe is in a range of 1.1≤(W1/W2)≤1.5.

8. The pneumatic tire according to claim 7, wherein the pin hole neighboring sipe is formed oscillating in a width direction in a depth direction.

9. The pneumatic tire according to claim 8, wherein only the pin hole neighboring sipe, in which the number of bend points is less than three in a length direction of the pin hole neighboring sipe among the plurality of pin hole neighboring sipes, is formed in the high rigidity shape.

10. The pneumatic tire according to claim 9,
the pneumatic tire being molded by a tire molding mold comprising a plurality of sectors divided in a tire circumferential direction, and
only the pin hole neighboring sipe, among the plurality of pin hole neighboring sipes, located at or near a position corresponding to a division position between the sectors of the tire molding mold in the land portion, being formed in the high rigidity shape.

11. A tire molding mold comprising:
a plurality of sectors divided in a tire circumferential direction;
a plurality of sipe blades disposed on a tread molding surface of the sectors; and
a plurality of mold pins disposed on the tread molding surface,
the sipe blades being disposed at positions where a distance Dsm from the mold pin and a diameter Dpm of the mold pin satisfy a relationship of (Dsm/Dpm)≥4.0,
a pin neighboring blade, among the plurality of sipe blades, in which the distance Dsm from the mold pin and the diameter Dpm of the mold pin satisfying a relationship of (Dsm/Dpm)≤5.0,
among one or more sipe blades, among the plurality of sipe blades, in which the distance Dsm of the mold pin and the diameter Dpm of the mold pin satisfy a relationship of (Dsm/Dpm)>5.0, a normal blade being defined in which the distance Dsm from the mold pin is smallest,
the pin neighboring blade being formed in a high rigidity shape having higher rigidity than the normal blade, and
a maximum depth of the pin neighboring blade being shallower than a maximum depth of the normal blade.

12. A pneumatic tire comprising:
a plurality of sipes disposed in a land portion formed in a tread portion; and
a plurality of pin holes for stud pins disposed in the land portion,
the plurality of sipes being disposed at positions where a distance Ds from the pin hole and a diameter Dp of the pin hole satisfy a relationship of (Ds/Dp)≥4.0,
a pin hole neighboring sipe, among the plurality of sipes, in which the distance Ds from the pin hole and the diameter Dp of the pin hole satisfying a relationship of (Ds/Dp)≤5.0,
among one or more sipes, of the plurality of sipes, in which the distance Ds from the pin hole and the diameter Dp of the pin hole satisfy a relationship of (Ds/Dp)>5.0, a normal sipe being defined in which the distance Ds from the pin hole is smallest,
the pin hole neighboring sipe being formed in a high rigidity shape having higher rigidity than the normal sipe, and
a ratio of a maximum depth H1 of the pin hole neighboring sipe to a maximum depth H2 of the normal sipe being in a range of 0.3≤(H1/H2)≤0.8.

13. A pneumatic tire comprising:
a plurality of sipes disposed in a land portion formed in a tread portion; and
a plurality of pin holes for stud pins disposed in the land portion, the plurality of sipes being disposed at positions where a distance Ds from the pin hole and a diameter Dp of the pin hole satisfy a relationship of (Ds/Dp)≥4.0, a pin hole neighboring sipe, among the plurality of sipes, in which the distance Ds from the pin hole and the diameter Dp of the pin hole satisfying a relationship of (Ds/Dp)≤5.0, among one or more sipes, of the plurality of sipes, in which the distance Ds from the pin hole and the diameter Dp of the pin hole satisfy a relationship of (Ds/Dp)>5.0, a normal sipe being defined in which the distance Ds from the pin hole is smallest, the pin hole neighboring sipe being formed in a high rigidity shape having higher rigidity than the normal sipe, and a ratio of a maximum width W1 of the pin hole neighboring sipe to a maximum width W2 of the normal sipe being in a range of 1.1≤(W1/W2)≤1.5.

\* \* \* \* \*